US011052001B2

(12) United States Patent
Simons et al.

(10) Patent No.: US 11,052,001 B2
(45) Date of Patent: *Jul. 6, 2021

(54) MOBILE CHAIR APPARATUS COMPRISING FOOT PEDALS

(71) Applicant: Kenneth A. Simons, Bedminster, NJ (US)

(72) Inventors: Kenneth A. Simons, Bedminster, NJ (US); Ashley Guy, Payson, UT (US)

(73) Assignee: VELOCHAIR GROUP LLC, Bedminster, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/357,983

(22) Filed: Mar. 19, 2019

(65) Prior Publication Data

US 2019/0290512 A1    Sep. 26, 2019

Related U.S. Application Data

(60) Provisional application No. 62/647,319, filed on Mar. 23, 2018.

(51) Int. Cl.
*A61G 5/02*    (2006.01)
*A61G 5/10*    (2006.01)
(Continued)

(52) U.S. Cl.
CPC .............. *A61G 5/022* (2013.01); *A61G 5/023* (2013.01); *A61G 5/024* (2013.01); *A61G 5/08* (2013.01);
(Continued)

(58) Field of Classification Search
CPC ...... A61G 5/1051; A61G 5/023; A61G 5/025; A61G 5/026
(Continued)

(56) References Cited

U.S. PATENT DOCUMENTS 1,056,328 A    3/1913    Frantz
1,124,717 A    1/1915    Motes
(Continued)

FOREIGN PATENT DOCUMENTS

AU    2001261603 B2    5/2005
CH    566888 A5    9/1975
(Continued)

OTHER PUBLICATIONS

Examination Report dated Sep. 23, 2020, and issued in connection with Indian Patent Application No. 201846021125.
(Continued)

*Primary Examiner* — Minnah L Seoh
*Assistant Examiner* — Conan D Duda
(74) *Attorney, Agent, or Firm* — Norris McLaughlin, P.A.

(57) ABSTRACT

A mobile chair apparatus is described that comprises a drive assembly that preferably includes one or more moveable foot pedals, and drive wheels which rotate in response to rotation of the foot pedals by the mobile chair occupant, and a steering assembly which comprises two steering wheels and at least one tiller, configured such that forward and backward movement of said tiller will translate into movement of both steering wheels, wherein the drive assembly and the steering assembly concurrently enable the mobile chair occupant to propel and steer the mobile chair apparatus without assistance from another person.

21 Claims, 36 Drawing Sheets

(51) Int. Cl.
  *B62M 1/36* (2013.01)
  *A61G 5/08* (2006.01)
  *A61G 5/12* (2006.01)
  *A61G 5/04* (2013.01)
(52) U.S. Cl.
  CPC ......... *A61G 5/1005* (2013.01); *A61G 5/1051* (2016.11); *A61G 5/125* (2016.11); *B62M 1/36* (2013.01); *A61G 5/04* (2013.01); *A61G 5/0866* (2016.11); *A61G 2203/10* (2013.01)
(58) Field of Classification Search
  USPC ...................................................... 280/261
  See application file for complete search history.

(56) References Cited

U.S. PATENT DOCUMENTS

| | | | |
|---|---|---|---|
| 1,219,295 A | 3/1917 | Hadley | |
| 2,576,413 A | 11/1951 | Padjen | |
| 2,578,828 A | 12/1951 | Nelson | |
| 2,643,898 A | 6/1953 | Everest et al. | |
| 2,814,505 A | 11/1957 | Kelly | |
| 3,309,110 A | 3/1967 | Bulmer | |
| 3,381,973 A | 5/1968 | Carr | |
| 3,387,681 A | 6/1968 | Rabjohn | |
| 3,666,292 A | 5/1972 | Bartos | |
| 3,669,468 A | 6/1972 | Rich | |
| 3,794,132 A | 2/1974 | Moon | |
| 3,877,725 A | 4/1975 | Barroza | |
| 3,960,392 A | 6/1976 | Read | |
| 4,098,521 A * | 7/1978 | Ferguson | A61G 5/00 280/247 |
| 4,103,921 A * | 8/1978 | Brooks | B62D 21/183 280/259 |
| 4,198,072 A * | 4/1980 | Hopkins | B62K 3/005 280/259 |
| 4,209,073 A * | 6/1980 | Enix | A61G 5/045 180/11 |
| 4,239,248 A * | 12/1980 | Ewers | A61G 5/02 280/270 |
| 4,274,651 A * | 6/1981 | Dumont | A61G 5/023 192/93 R |
| 4,279,429 A * | 7/1981 | Hopkins | B62K 3/005 280/266 |
| 4,354,691 A * | 10/1982 | Saunders | A61G 5/025 280/244 |
| 4,403,673 A * | 9/1983 | Ball | A61G 5/042 180/214 |
| 4,453,729 A * | 6/1984 | Lucken | A61G 5/023 192/46 |
| 4,460,190 A * | 7/1984 | Spiess | A61G 5/023 280/247 |
| 4,475,613 A * | 10/1984 | Walker | A61G 5/045 180/22 |
| 4,497,502 A * | 2/1985 | Forbes | B62D 9/02 280/240 |
| 4,506,900 A * | 3/1985 | Korosue | A61G 5/023 192/41 S |
| 4,560,181 A * | 12/1985 | Herron | A61G 5/023 280/244 |
| 4,580,802 A * | 4/1986 | Herman | B62K 5/08 280/263 |
| 4,586,723 A * | 5/1986 | Nabinger | A61G 5/10 280/250.1 |
| 4,652,026 A * | 3/1987 | Byrge | A61G 5/022 280/246 |
| 4,674,762 A * | 6/1987 | Nelson | B62M 1/00 267/273 |
| 4,735,431 A * | 4/1988 | Tait | A61G 5/023 280/246 |
| 4,758,013 A * | 7/1988 | Agrillo | A61G 5/023 192/94 |
| 4,762,332 A * | 8/1988 | Seol | A61G 5/023 192/28 |
| 4,811,964 A * | 3/1989 | Horn | A61G 5/023 188/2 F |
| 4,826,190 A * | 5/1989 | Hartmann | B62K 3/005 280/236 |
| 4,865,344 A * | 9/1989 | Romero, Sr. | A61G 5/023 280/255 |
| 4,892,323 A * | 1/1990 | Oxford | A61G 5/023 105/129 |
| 4,962,942 A * | 10/1990 | Barnett | A61G 5/023 280/250.1 |
| 4,993,732 A * | 2/1991 | Wedemeyer | A61G 5/022 280/250.1 |
| 5,007,655 A | 4/1991 | Hanna | |
| 5,020,815 A | 6/1991 | Harris et al. | |
| 5,069,469 A | 12/1991 | Rosengrant et al. | |
| 5,145,196 A | 9/1992 | Langkamp | |
| D330,177 S * | 10/1992 | Shetter | D12/128 |
| 5,242,179 A | 9/1993 | Beddome et al. | |
| 5,244,051 A | 9/1993 | Wu | |
| 5,273,304 A | 12/1993 | Berkheimer | |
| 5,280,937 A | 1/1994 | Needham | |
| 5,303,945 A | 4/1994 | Oxford | |
| 5,322,312 A | 6/1994 | Cammack | |
| 5,324,060 A | 6/1994 | Van Vooren et al. | |
| 5,482,125 A | 1/1996 | Pagett | |
| 5,499,833 A | 3/1996 | Her et al. | |
| 5,509,673 A | 4/1996 | Wu et al. | |
| 5,547,038 A | 8/1996 | Madwed | |
| 5,568,935 A | 10/1996 | Mason | |
| 5,632,499 A | 5/1997 | Hutcherson et al. | |
| 5,826,897 A | 10/1998 | Beard | |
| 5,865,455 A | 2/1999 | Taylor | |
| 5,901,973 A | 5/1999 | Warren | |
| 5,941,547 A | 8/1999 | Drake | |
| 6,007,082 A * | 12/1999 | Watwood | A61G 5/022 188/2 F |
| 6,024,369 A * | 2/2000 | Goldstein | A61G 5/023 280/248 |
| 6,092,822 A * | 7/2000 | Salmon | A61G 5/023 280/250.1 |
| 6,158,757 A * | 12/2000 | Tidcomb | A61G 5/023 280/244 |
| 6,173,986 B1 * | 1/2001 | Sicher | A61G 5/023 280/242.1 |
| 6,179,314 B1 * | 1/2001 | Jones | B62K 3/005 188/68 |
| 6,196,565 B1 * | 3/2001 | Chubbuck | A61G 5/02 280/255 |
| 6,224,078 B1 * | 5/2001 | Tidcomb | A61G 5/023 280/240 |
| 6,234,504 B1 * | 5/2001 | Taylor | A61G 5/023 280/250.1 |
| 6,302,421 B1 * | 10/2001 | Lee | A61G 5/023 280/210 |
| 6,325,398 B1 * | 12/2001 | Banzi | A61G 5/023 280/244 |
| 6,402,174 B1 * | 6/2002 | Maurer | B62K 3/005 280/266 |
| 6,478,099 B1 * | 11/2002 | Madwed | A61G 5/045 180/21 |
| D478,846 S * | 8/2003 | Sauter | D12/107 |
| 6,634,663 B2 * | 10/2003 | Mitchell | A61G 5/02 280/250.1 |
| 6,648,354 B2 * | 11/2003 | James | A61G 5/023 280/250.1 |
| 6,715,780 B2 * | 4/2004 | Schaeffer | A61G 5/023 280/248 |
| 6,746,034 B2 * | 6/2004 | Fowles | A61G 5/02 280/244 |
| 6,755,430 B1 * | 6/2004 | Watwood | A61G 5/023 280/246 |
| D493,391 S * | 7/2004 | Gunter | D12/112 |
| 6,820,885 B1 * | 11/2004 | Oshimo | A61G 5/025 280/243 |
| 6,889,991 B1 * | 5/2005 | Facer | A61G 5/022 280/244 |

(56) References Cited

U.S. PATENT DOCUMENTS

| | | | |
|---|---|---|---|
| 6,893,035 B2 * | 5/2005 | Watwood | A61G 5/023 280/242.1 |
| 6,910,701 B1 * | 6/2005 | Long | A61G 5/023 280/250 |
| 7,044,491 B2 | 5/2006 | Kettler et al. | |
| 7,114,737 B1 | 10/2006 | Rasmussen | |
| 7,188,853 B2 | 3/2007 | Yen | |
| 7,341,267 B2 | 3/2008 | Vroom | |
| 7,344,146 B2 * | 3/2008 | Taylor | A61G 5/023 280/242.1 |
| 7,520,519 B2 * | 4/2009 | Smurthwaite, Jr. | A61G 5/023 280/242.1 |
| 7,552,934 B2 | 6/2009 | Lee et al. | |
| 7,641,210 B2 * | 1/2010 | Babcock | A61G 5/022 280/250.1 |
| 7,677,586 B2 * | 3/2010 | Bloom | A61G 5/023 280/250.1 |
| D626,038 S * | 10/2010 | Li | D12/112 |
| 7,837,210 B2 * | 11/2010 | Kylstra | A61G 5/023 280/250.1 |
| 7,900,945 B1 | 3/2011 | Rackley | |
| 7,976,046 B2 | 7/2011 | Rathsack | |
| 8,342,555 B2 * | 1/2013 | Ball | B62K 3/005 280/278 |
| 8,517,407 B2 * | 8/2013 | Handa | A61G 5/1089 280/282 |
| 8,657,319 B1 * | 2/2014 | Cullen | A61G 5/023 280/250.1 |
| 8,672,075 B1 * | 3/2014 | Walker | B62M 6/70 180/206.1 |
| 8,777,249 B1 * | 7/2014 | Roman | A61G 5/026 280/250 |
| 9,010,786 B1 * | 4/2015 | Ekelem | A61G 5/025 280/244 |
| 9,033,356 B2 * | 5/2015 | Xiao | B62M 1/24 280/253 |
| 9,162,101 B2 * | 10/2015 | Zondervan | A63B 21/4033 |
| 9,359,034 B2 * | 6/2016 | Rasmussen | B62K 25/04 |
| 9,387,139 B2 | 7/2016 | Chang | |
| 9,398,988 B1 * | 7/2016 | DeMirza | A61G 5/1035 |
| 9,408,762 B1 * | 8/2016 | Baker | A61G 5/0833 |
| 9,452,316 B2 * | 9/2016 | Wu | A61G 5/1054 |
| 9,757,288 B1 * | 9/2017 | Simons | A61G 5/023 |
| 9,757,289 B1 * | 9/2017 | Simons | A61G 5/1051 |
| 10,076,456 B2 | 9/2018 | Simons et al. | |
| 2001/0013436 A1 | 8/2001 | Odell | |
| 2002/0053778 A1 | 5/2002 | Howard | |
| 2002/0101054 A1 | 8/2002 | James | |
| 2002/0153691 A1 | 10/2002 | Liao et al. | |
| 2003/0071435 A1 | 4/2003 | Schaeffer et al. | |
| 2004/0026891 A1 | 2/2004 | Berkelmans | |
| 2004/0051272 A1 | 3/2004 | Wong | |
| 2004/0104554 A1 | 6/2004 | Watwood et al. | |
| 2005/0093270 A1 | 5/2005 | Wilcox et al. | |
| 2006/0037788 A1 | 2/2006 | Madwed | |
| 2007/0040349 A1 | 2/2007 | Zhao | |
| 2007/0052196 A1 | 3/2007 | Taylor | |
| 2007/0085297 A1 | 4/2007 | Cruft | |
| 2007/0114750 A1 * | 5/2007 | Dix | A63B 21/158 280/250.1 |
| 2008/0073869 A1 | 3/2008 | Patterson | |
| 2008/0129008 A1 | 6/2008 | Tarasov | |
| 2008/0179855 A1 | 7/2008 | Wang et al. | |
| 2008/0238022 A1 | 10/2008 | Kylstra et al. | |
| 2008/0238023 A1 | 10/2008 | Bloom | |
| 2008/0246246 A1 | 10/2008 | Dix et al. | |
| 2008/0252036 A1 | 10/2008 | Smurthwaite | |
| 2009/0020979 A1 | 1/2009 | Genda et al. | |
| 2009/0051139 A1 | 2/2009 | Kylstra et al. | |
| 2009/0058035 A1 | 3/2009 | Babcock et al. | |
| 2009/0206574 A1 | 8/2009 | Green | |
| 2009/0283982 A1 | 11/2009 | Thomas | |
| 2010/0065346 A1 | 3/2010 | Porcheron | |
| 2010/0090436 A1 | 4/2010 | Fremgen | |
| 2010/0140898 A1 | 6/2010 | Purdue | |
| 2010/0156063 A1 | 6/2010 | Green | |
| 2010/0320719 A1 | 12/2010 | Rand et al. | |
| 2011/0215547 A1 | 9/2011 | Davenport | |
| 2011/0248467 A1 | 10/2011 | Ball et al. | |
| 2012/0012417 A1 | 1/2012 | Baker | |
| 2012/0061939 A1 | 3/2012 | Diaz-Ortiz et al. | |
| 2012/0267175 A1 | 10/2012 | Nanda et al. | |
| 2012/0318595 A1 | 12/2012 | Belenkov et al. | |
| 2013/0015632 A1 | 1/2013 | Winter, V et al. | |
| 2013/0113178 A1 | 5/2013 | Goldish et al. | |
| 2014/0346752 A1 | 11/2014 | Rasmussen | |
| 2015/0028558 A1 | 1/2015 | Hartman et al. | |
| 2015/0060156 A1 | 3/2015 | Husted et al. | |
| 2015/0141212 A1 | 5/2015 | Wu | |
| 2015/0190292 A1 | 7/2015 | Robins | |
| 2016/0058636 A1 | 3/2016 | Chang | |
| 2017/0065472 A1 | 3/2017 | Cunningham et al. | |
| 2017/0217527 A1 | 8/2017 | Li | |
| 2018/0000667 A1 * | 1/2018 | Simons | A61G 5/1005 |

FOREIGN PATENT DOCUMENTS

| | | |
|---|---|---|
| CN | 201832055 U | 5/2011 |
| CN | 20213649 U | 2/2012 |
| GB | 1 306 965 | 5/1970 |
| GB | 2 308 342 A | 6/1997 |
| JP | 2014-104191 A | 6/2014 |
| NL | 7007941 | 12/1970 |
| TW | M496465 U | 3/2015 |
| WO | 85/ 03265 A1 | 8/1985 |
| WO | 98/57837 A1 | 12/1998 |
| WO | 2007/041236 A2 | 4/2007 |
| WO | 2017/027890 A2 | 2/2017 |

OTHER PUBLICATIONS

Office Action dated Aug. 22, 2018, and issued in connection with Canadian Patent Application No. 2,977,616.
Office Action dated Jan. 3, 2019, and issued in connection with Canadian Patent Application No. 2,977,616.
Office Action dated Jan. 10, 2019, and issued in connection with Canadian Patent Application No. 2,977,616.
Office Action dated Jun. 4, 2019, and issued in connection with Canadian Patent Application No. 2,977,616.
Office Action dated May 12, 2020, and issued in connection with Canadian Patent Application No. 2,977,616.
Partial European Search Report dated Feb. 15, 2018, and issued in connection with European Patent Application No. 17 188 262.4.
Partial Opinion issued in connection with European Patent Application No. 17 188 262.4.
European Search Report dated Feb. 15, 2018, and issued in connection with European Patent Application No. 17 188 262.4.
Opinion issued in connection with European Patent Application No. 17 188 262.4.
Office Action dated Aug. 28, 2018, and issued in connection with Canadian Patent Application No. 3,004,731.
Office Action dated Dec. 18, 2018, and issued in connection with Canadian Patent Application No. 3,004,731.
Office Action dated Jan. 22, 2019, and issued in connection with Canadian Patent Application No. 3,004,731.
Office Action dated Jun. 6, 2019, and issued in connection with Canadian Patent Application No. 3,004,731.
Office Action dated Oct. 18, 2019, and issued in connection with Canadian Patent Application No. 3,004,731.
Office Action dated Apr. 9, 2020, and issued in connection with Canadian Patent Application No. 3,004,731.
Office Action dated Sep. 15, 2020, and issued in connection with Canadian Patent Application No. 3,004,731.
European Search Report dated Jan. 9, 2019, and issued in connection with European Patent Application No. 18 172 647.2.
Opinion issued in connection with European Patent Application No. 18 172 647.2.
Office Action dated Jul. 6, 2020, in connection with European Patent Application No. 18 172 647.2.

(56) References Cited

OTHER PUBLICATIONS

Examination Report dated Jan. 2, 2020, and issued in connection with Indian Patent Application No. 201744005333.
Extended European Search Report dated Jun. 6, 2018, and issued in connection with European Patent Application No. 17 188 262.4.
European Search Report dated Jan. 18, 2019, and issued in connection with European Patent Application No. 18 172 647.2.
Partial European Search Report dated Feb. 26, 2018, and issued in connection with European Patent Application No. 17 188 262.4.
"The EZ Chair—pedal power", Tapping Technology, found on website http://msa.maryland.gov/megafile/msa/speccol/sc5300/sc5339//000113/000000/000450/unrestricted/20040941e/art_1.html, pp. 1-3, downloaded 2015.
C. S. Barr, et al, "Pedal Powered Wheelchair Seems So Wrong", found on website http://www.ohgizmo.com/2008/04/09/pedal-powered-wheelchair-seems-so-wrong/, 2008, pp. 1-3.
"About the Chair", found on website http://www.pedalwheelchair.com/about-the-chair.html, pp. 1-2, downloaded 2015.
Office Action dated Jun. 7, 2017, and issued in connection with Canadian Patent Application No. 2,956,619.
Partial European Search Report and Provisional Opinion issued in connection with European Patent Application No. 17 154 432.2.
Examination Report dated Nov. 4. 2020, in connection with Indian Patent Application No, 201746030889.

* cited by examiner

205c

MOBILE CHAIR APPARATUS COMPRISING FOOT PEDALS

This application claims priority benefit of U.S. Provisional Application No. 62/647,319, filed Mar. 23, 2018, the disclosure of which patent application is incorporated herein by reference.

FIELD OF THE INVENTION

This application relates to a mobile chair apparatus, which enables an occupant user of the apparatus to steer and propel movement of the chair without assistance from another person.

DISCUSSION AND COMPARISON WITH RELEVANT PRIOR ART

Currently there is an unmet need for providing mobility to people who have limited ambulation, in particular people who retain limited use of their legs but have difficulty standing for an extended period of time and/or walking long distances. Limited ambulation afflicts many patients suffering from neurological diseases such as Multiple Sclerosis, Parkinson's disease, Spinal Stenosis, etc. as well as patients with temporary or permanent injuries and strokes. While these patients have limited use of one or both legs, many activities of daily living, including but not limited to shopping, attending a sports game, and travel, can be challenging.

The mobile chair apparatus described herein (also referred to as the "Pedal Chair" or the "VeloChair") seeks to address this unmet need by providing improved mobility and independence to persons who have reduced movement in one or both legs and some movement in at least one arm. The Pedal Chair is also useful as an exercise device for patients in need thereof. Briefly, according to an embodiment of the instant invention, the pedal chair apparatus is a mobile chair apparatus having a front end, a rear end, a top side and a bottom side, which comprises: (a) a steering assembly comprising: i. a first armrest connected to a first link arm, and a second armrest connected to a second link arm; ii. a first tie rod connected to the first link arm and a second tie rod connected to the second link arm; iii. a first steering block connected to the first tie rod and a second steering block connected to the second tie rod; iv. a third tie rod interconnecting the first and the second steering blocks; and v. a first steering wheel and a second steering wheel each located at the rear end of the mobile chair apparatus, the first and second steering wheels move in response to movement of one or both of the first and second armrests, and (b) a drive assembly preferably comprising a pair of foot pedals, and (c) a seat. An alternative steering assembly of the VeloChair uses tillers instead of armrests, wherein the steering wheels move in response to forward and backward movement of one or both tillers.

A number of mobility chairs with pedaling mechanisms have been proposed. Unlike the Pedal Chair, many prior art devices are removable attachments to conventional wheelchairs, including those discussed in U.S. Pat. Nos. 5,273,304, 5,324,060 and U.S. Patent Application Publication No. 2008/0246246. Attaching such prior art devices to a conventional wheelchair can prove difficult for someone with limited use of one or more of their limbs. Moreover, since the conventional wheelchair is not designed to be moved using propulsion provided by rotation of foot pedals, the apparatus assembled using said attachments could be cumbersome and inefficient in translating movement of the foot pedals to forward movement of the chair. Further, the assembled apparatus lacks many of the desirable features of the novel Pedal Chair described herein. For instance, the assembled apparatus in each of these references has front steering wheels and larger rear driving wheels of the conventional wheelchair, as well as additional wheel or wheels provided by the attachment. In contrast, the Pedal Chair of the instant invention requires only 4 wheels, i.e., two front drive wheels and two rear steering wheels, to be operable. In a preferred embodiment, the novel Pedal Chair can comprise a seatback that is foldable into the apparatus via a hinge or pivot connection. In contrast, the seat position in a conventional wheelchair is fixed. Additional embodiments of the Pedal Chair includes a length-wise and angle-wise adjustable boom and optional electrical assist, which are not available in the prior art designs.

U.S. Pat. No. 6,092,822 teaches a stand-alone wheelchair comprising foot pedals that may be self-propelled by a person in the chair or pushed by another person. As with the teaching of the '304 Patent, the '060 Patent, and the '246 Publication, the wheel placement of the '822 Patent reflects the conventional design, i.e., two front steering wheels and two larger rear driving wheels. Importantly, the steering mechanism of the '822 Patent differs from that of the Pedal Chair in that steering of the '822 Patent is accomplished by moving a handle in the form of a longitudinal rod. The steering wheel rotates in response to rotation of the longitudinal rod.

A chair known as the "Profhand pedal wheelchair" developed by Yasunobu Handa is described in U.S. Pat. No. 8,517,407 and is commercially available from Pedal Wheelchair LLC of Barberton, Ohio. The wheels of the Profhand pedal wheelchair, unlike conventional wheelchair designs, include two front drive wheels and a single rear steering wheel. Unlike the Pedal Chair, the "Profhand pedal wheelchair" requires outriggers with two additional wheels towards the rear end and front end of the chair, apparently for stability. In a preferred embodiment, the support shaft (boom) of the Pedal Chair on which the foot pedals are located is adjustable both in angle and in length, unlike that of the "Profhand pedal wheelchair. Moreover, the steering mechanism of the "Profhand pedal wheelchair" differs from that of the Pedal Chair in that it requires use of working fingers to grasp and operate the steering arm either located on the right or left side of the chair. The steering mechanism further attaches to the steering rear wheel via a cable connection that requires adjustment, which system is prone to breakage.

Japanese Publication No. JP 2014104191 teaches a foot pedal-driven wheelchair having a rotating shaft on which the pedals are mounted. According to this design an idler wheel is provided on the right and left sides of the seat; a single steering wheel for determining travel direction is provided separately from the idler wheel at the rear of the chair, and driving force of the rotating shaft driven by motion of the foot pedals is transmitted to the steering wheel to drive the steering wheel, and to thereby travel. Further according to this design, direction of travel is controlled by a lever (element 23) having a grip to be held. Thus, operation of this wheelchair requires working fingers.

Chinese Publication No. CN202136498 and Chinese Publication No. CN201832055 describe rehabilitation exercise devices comprising a wheelchair. According to these designs, movement of the foot pedals cause movement of an occupant user's legs, rather than the other way around. To use the rehabilitation exercise device of CN202136498, a patient sits on the wheelchair with the two feet placed on the pedals, and pushes the two main wheels by hand to move forward. The drive wheel drives the driven wheel which is arranged on a support to rotate through a chain, and the driven wheel drives the movable foot pedals to rotate and thus to exercise the lower limbs, so as to achieve the rehabilitation purpose. The chair of CN201832055 requires a non-occupant user to push to move the chair. When the chair is pushed to move, the gear on the rear of the wheelchair drives a chain wheel to rotate by the chain, and the chain wheel drives the pedals to move circumferentially so that the patient can perform recovery motions of legs by sitting on the wheelchair with feet placed on the pedals.

The apparatus of the present invention addresses and overcomes shortcomings of the prior art in one or more respects. In one such respect, none of the foregoing prior art employs armrest-facilitated steering design as provided by the Pedal Chair. The armrest-facilitated steering design provided by the present invention is advantageous over prior art designs because its mechanical connections are robust, and does not require fragile and adjustable components such as a cable which may undesirably be prone to breakage, particularly when used under stress such as when trying to move when the chair is not in motion, and require adjustment or replacement. Moreover, the Pedal Chair can be used by an individual who has even only limited movement of only one arm and no working fingers on either hand. Further, because steering can be accomplished by movement of either armrest, it is not necessary to rearrange mechanical components of this chair to accommodate patients with disability of different arms, or who wish to exercise different arms. The tiller-facilitated steering is also advantageous since the tillers are removable on either side to enable ease of transfer in or out of the VeloChair.

These and further aspects of the invention will be understood with reference to the following specification and drawings.

SUMMARY OF THE INVENTION

Disclosed is a mobile chair apparatus having a front end, a rear end, a top side and a bottom side, which comprises: (a) a steering assembly comprising: i. a first armrest connected to a first link arm, and a second armrest connected to a second link arm; ii. a first tie rod connected to the first link arm and a second tie rod connected to the second link arm; iii. a first steering block connected to the first tie rod and a second steering block connected to the second tie rod; iv. a third tie rod interconnecting the first and the second steering blocks; and v. a first steering wheel and a second steering wheel each located at the rear end of the mobile chair apparatus, the first and second steering wheels move in response to movement of one or both of the first and second armrests, and (b) a drive assembly preferably comprising a pair of foot pedals, and (c) a seat.

Also disclosed is said mobile chair apparatus comprising an alternative steering assembly arrangement, which comprises (i) first armrest operably connected to a first link arm, and a second armrest operably connected to a second link arm; (ii) a first steering tube operably connected to the first link arm and a second steering tube operably connected to the second link arm; (iii) a first gear assembly operably connected to the first steering tube and a second gear assembly operably connected to the second steering tube; (iv) a first steering wheel operably connected to the first gear assembly and a second steering wheel operably connected to the second gear assembly, wherein the first and second steering wheels are located at the rear end of the mobile chair apparatus, and move in response to movement of one or both of the first and second armrests. Also disclosed is said mobile chair apparatus comprising an alternative steering assembly arrangement, which comprises (i) a first tiller and optionally a second tiller, (ii) a first large link arm and a second large link arm, wherein the first tiller is operably connected to the first large link arm, preferably via a first tiller receiving socket, and the second large link arm is operably connected to the second tiller, when present, preferably via a second tiller receiving socket, (iii) a first steering tube, a first steering tube shaft, a first steering tube gear, a second steering tube, a second steering tube shaft, and a second steering tube gear, wherein said first steering tube has the first steering shaft inserted therein, said first steering tube shaft being operably connected to the first large link arm, preferably via a first small link arm, and wherein said second steering tube has the second steering shaft inserted therein, said second steering tube shaft being operably connected to the second large link arm, preferably via a second small link arm, and wherein the first steering gear is mounted to the first steering shaft, and the second steering gear is mounted to the second steering shaft. (iv) a connecting tie rod; and (v) a first steering wheel and a second steering wheel each located at the rear end of the mobile chair apparatus, the first and second steering wheels configured to move in response to movement of one or both of the first and second tillers.

Also disclosed is a mobile chair apparatus having a front end, a rear end, a top side and a bottom side, comprising: (a) a steering assembly, (b) a drive assembly comprising: i. a first drive wheel and a second drive wheel each connected to an axle; ii. a support shaft having a distal end and a proximal end, wherein the proximal end of the support shaft is located on the bottom side of the mobile chair apparatus; iii. a pair of foot pedals connected to a crank located at the distal end of the support shaft; iv. a gear hub located at the proximal end of the support shaft; v. a first chain connecting the crank to the gear hub; and vi. a second chain shorter in length than the first chain, said second chain connecting the gear hub to the axles or connecting components of the gear hub, and (c) a seat.

Also disclosed is a mobile chair apparatus having a front end, a rear end, a top side and a bottom side, comprising: (a) a steering assembly, (b) a drive assembly comprising: i. a first drive wheel and a second drive wheel each connected to an axle; ii. a support shaft having a distal end and a proximal end, wherein the proximal end of the support shaft is located on the bottom side of the mobile chair apparatus; iii. a pair of foot pedals connected to a crank located at the distal end of the support shaft; iv. a chain operably connecting the crank to the axle, and (c) a seat.

Also disclosed is a mobile chair apparatus having a front end, a rear end, a top side and a bottom side, comprising: (a) a steering assembly, (b) a drive assembly, and (c) a seat, wherein the steering assembly comprises: (i) a first tiller and optionally a second tiller, (ii) a first steering wheel and a second steering wheel each located at the rear end of the mobile chair apparatus on opposite sides of the apparatus, the first and second steering wheels being operably connected to each other, and being operably connected to, and configured to move in response to, movement of the first tiller, and/or the second tiller, if present.

DETAILED DESCRIPTION

Figure 1:
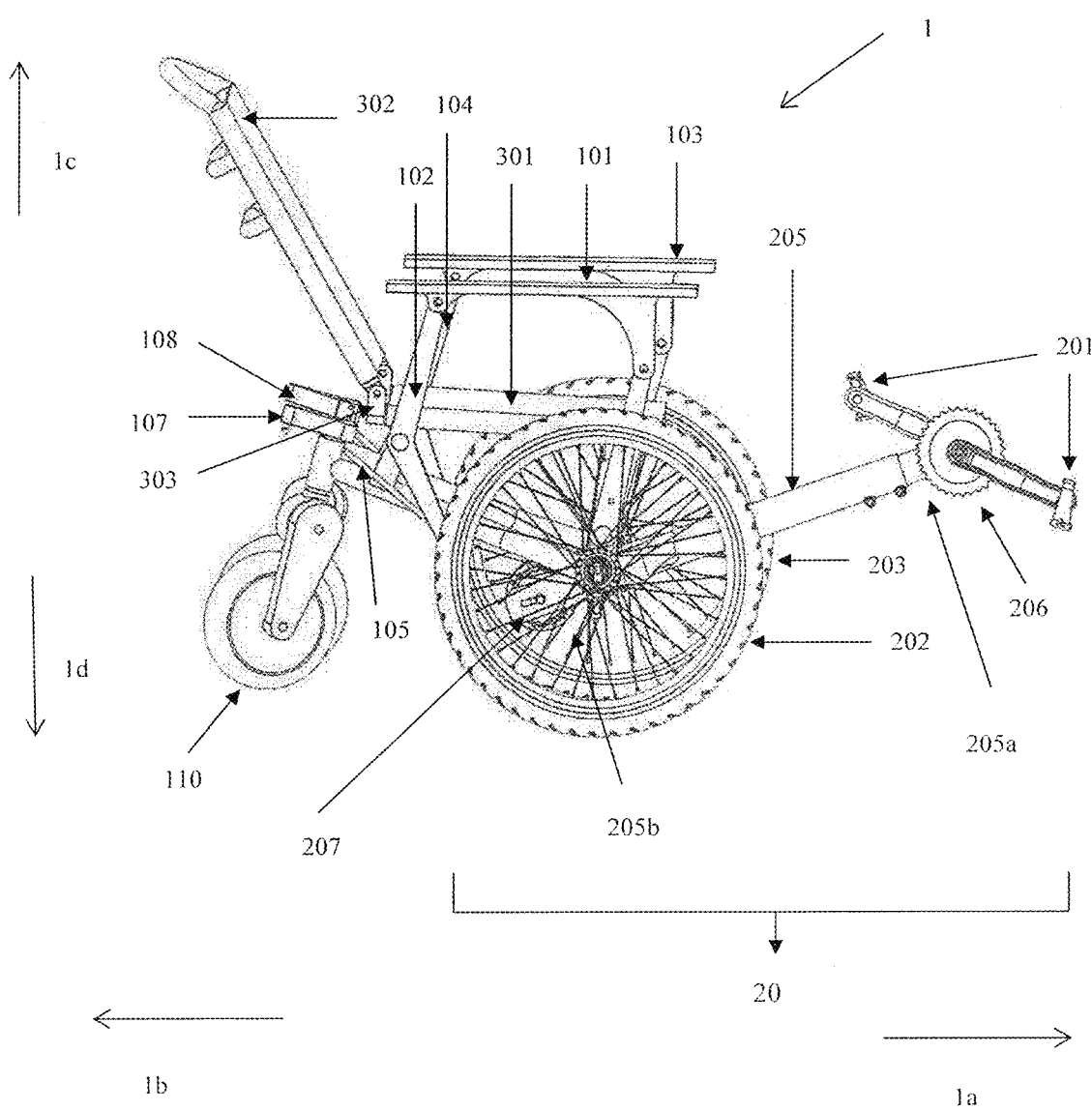
FIG. 1: shows a side perspective view of an embodiment of a mobile chair apparatus (via., Pedal Chair) as described herein.
Figure 2:
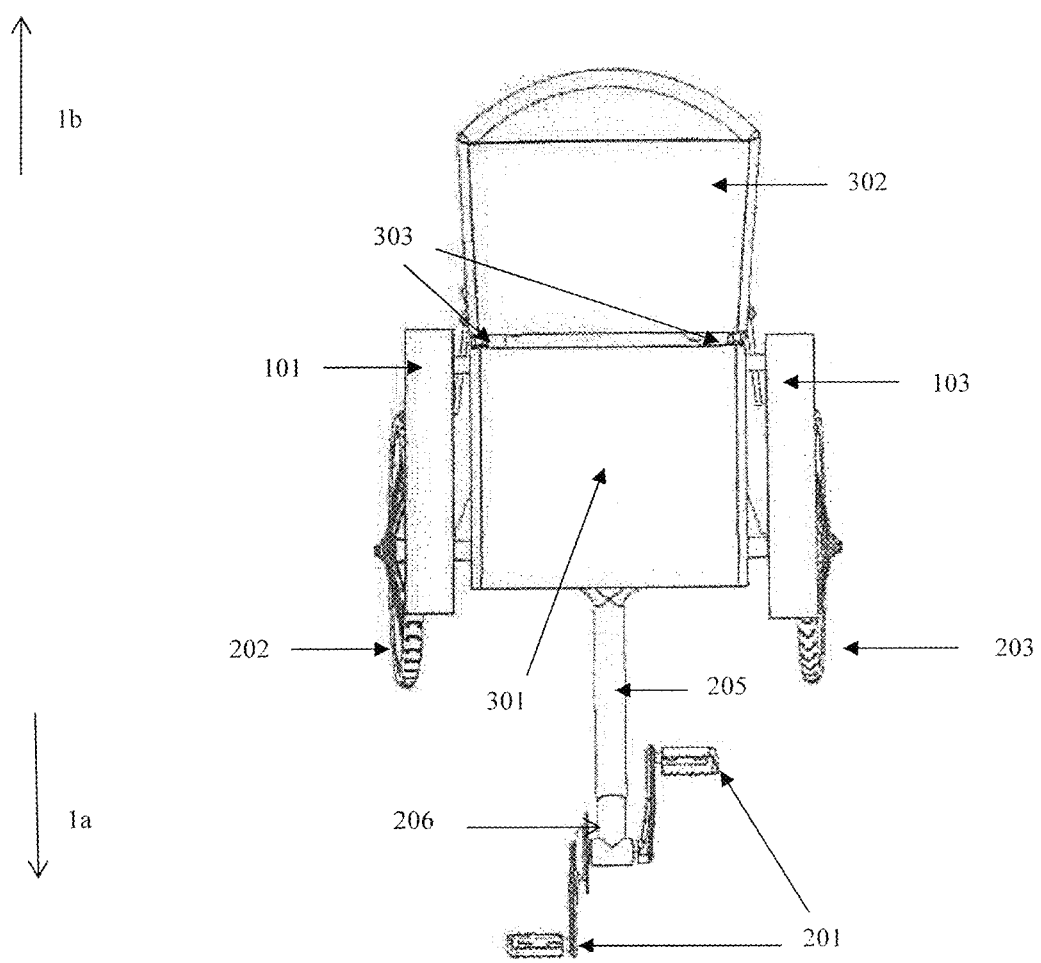
FIG. 2: shows a top view of a mobile chair apparatus as described herein.
Figure 3:
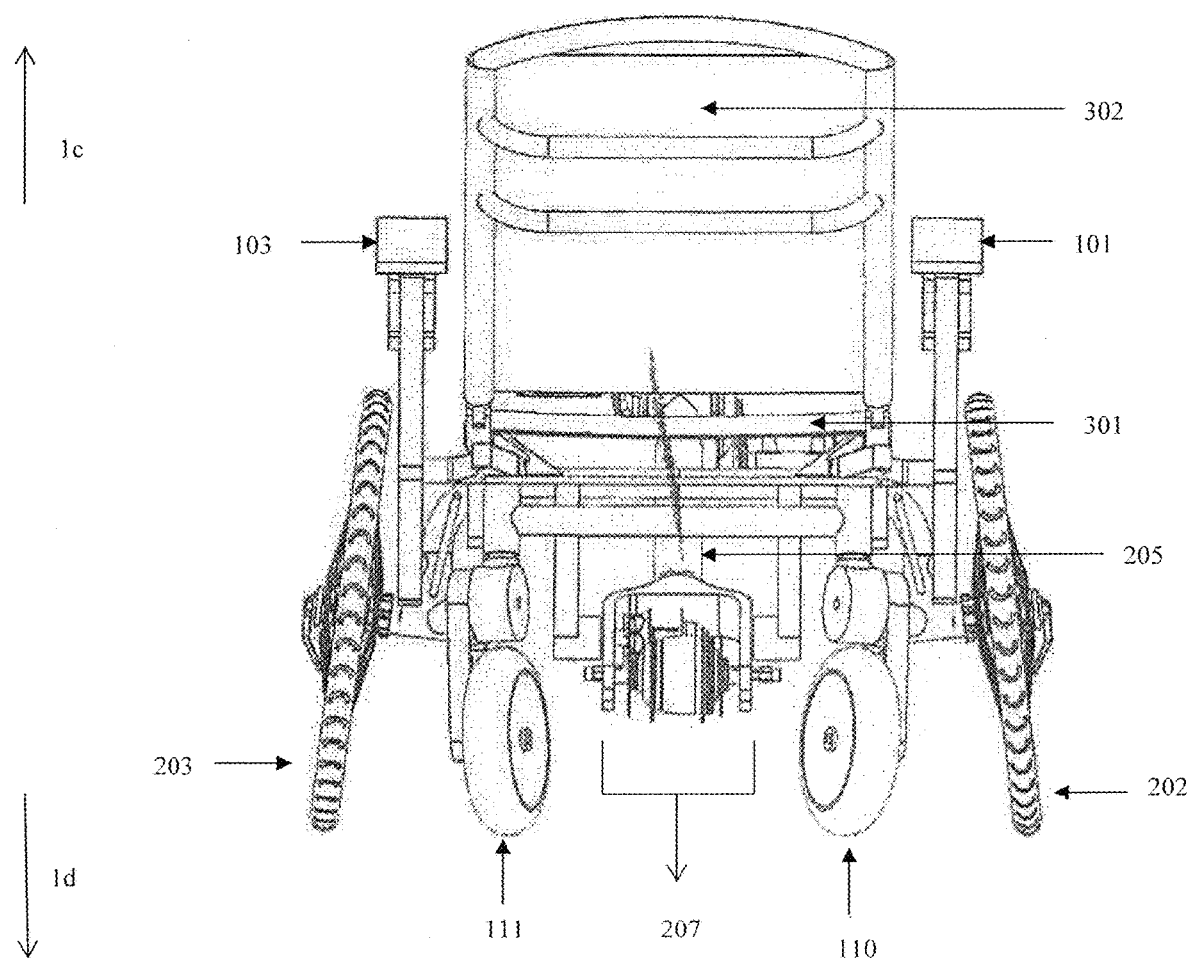
FIG. 3: shows a back view of a mobile chair apparatus as described herein.
Figure 4:
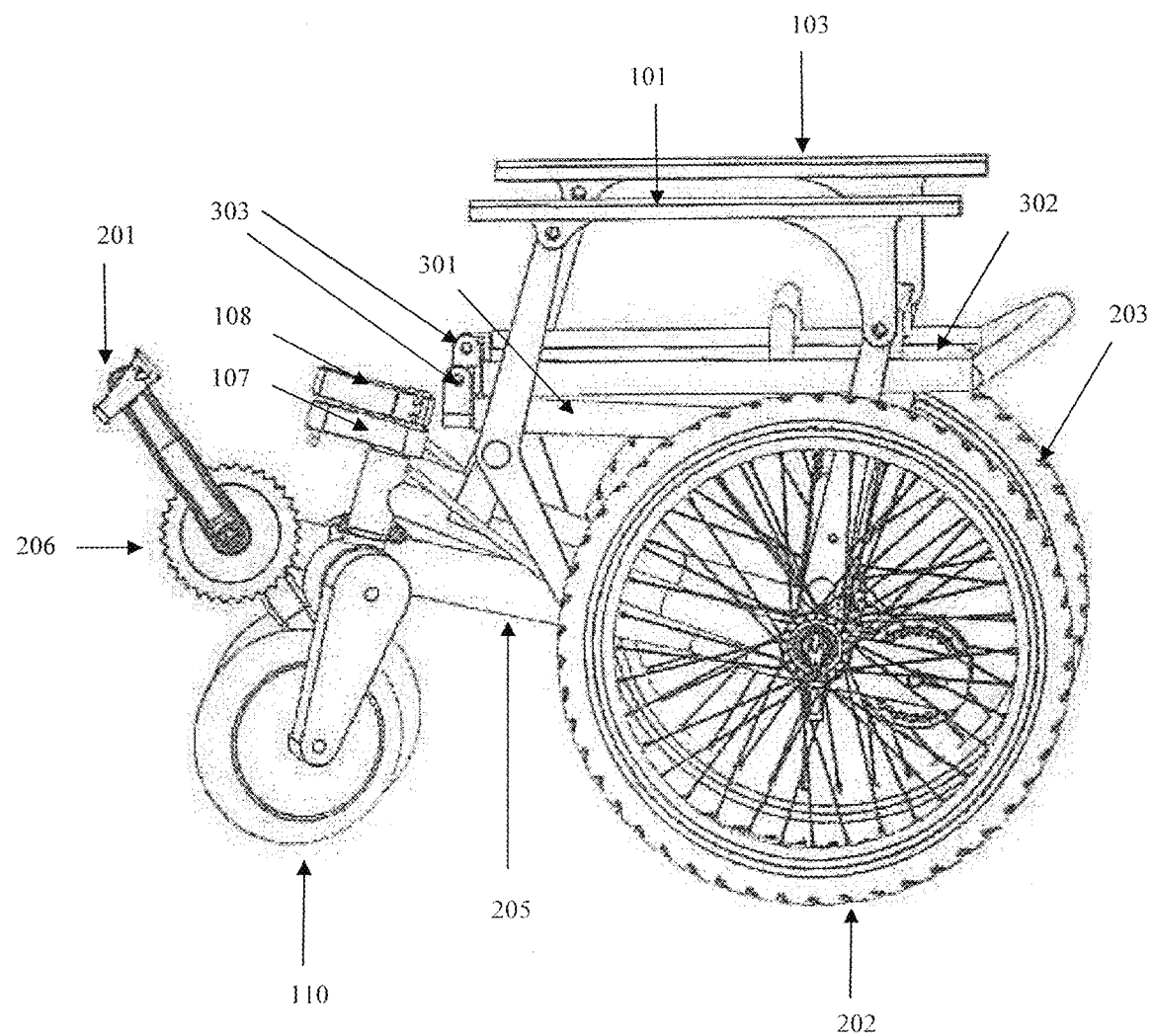
FIG. 4: shows a side perspective view of a mobile chair apparatus as described herein, with seatback and support shaft (pedal support boom) in the folded position.
Figure 5:
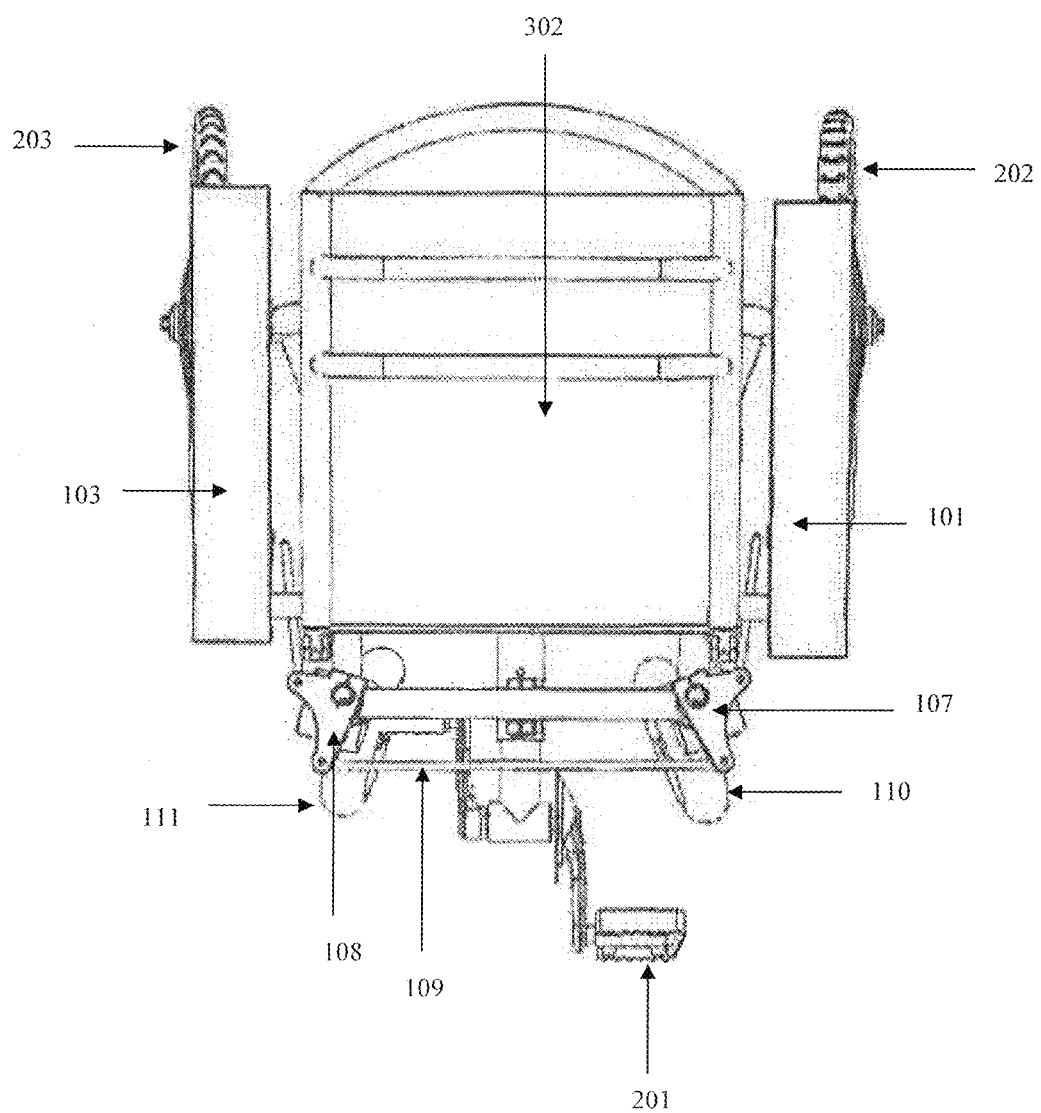
FIG. 5: shows a top view of a mobile chair apparatus as described herein, with seatback and support shaft (pedal support boom) in the folded position.
Figure 6:
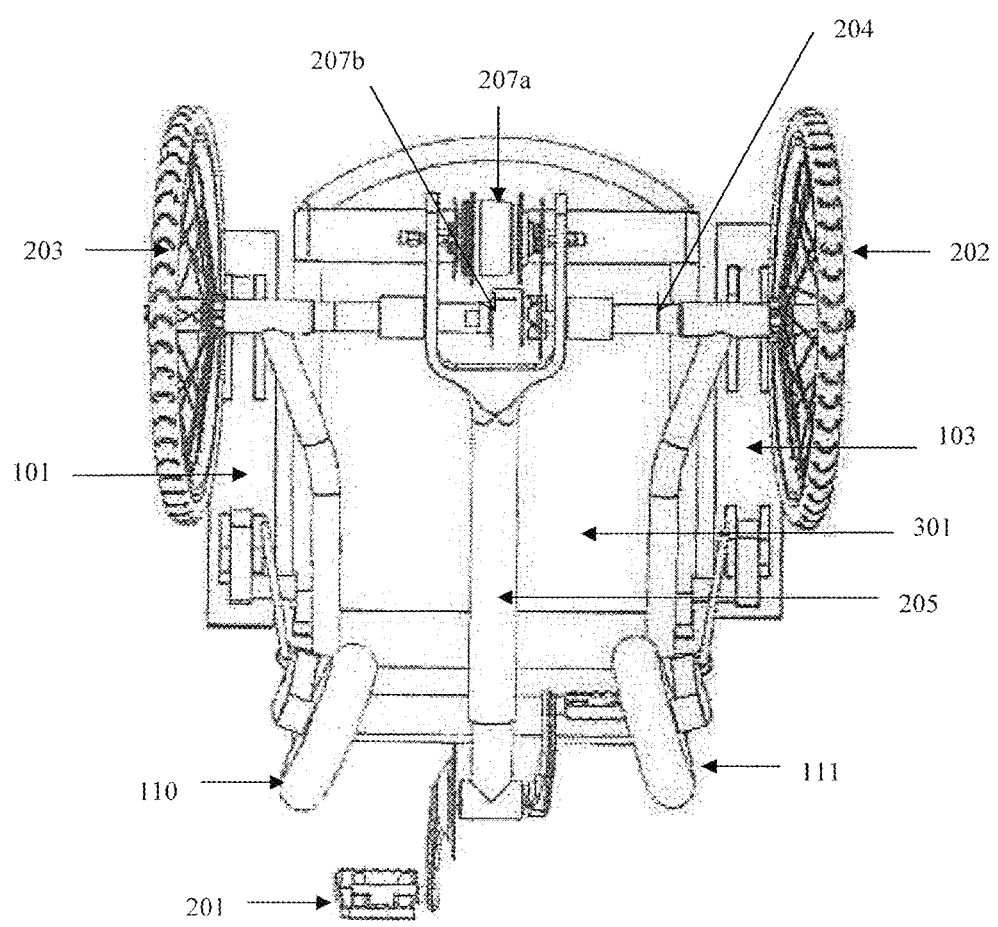
FIG. 6: shows a bottom view of a mobile chair apparatus as described herein, with seatback and support shaft (pedal support boom) in the folded position.
Figure 7:
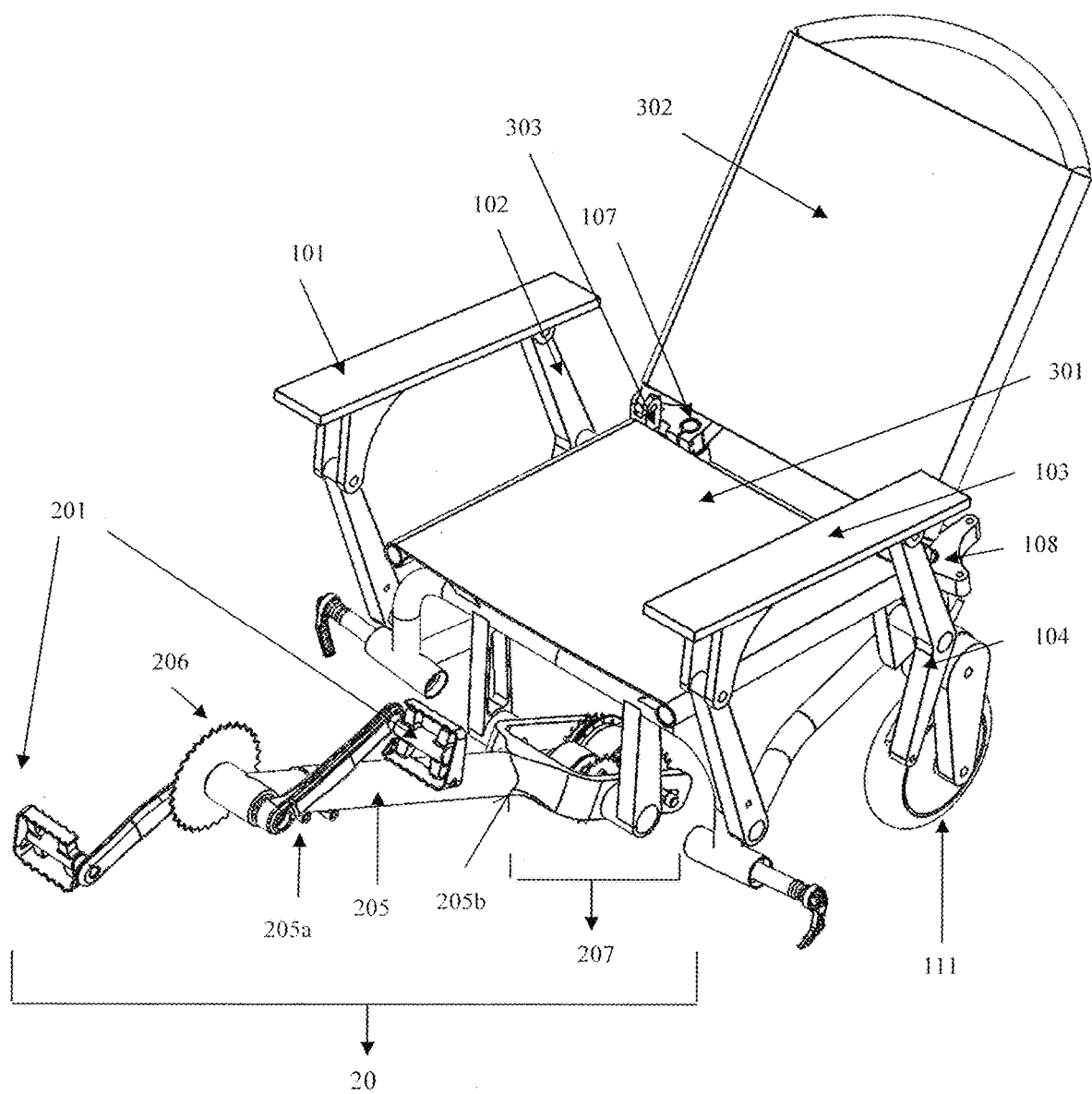
FIG. 7: shows a perspective view of a mobile chair apparatus as described herein, having drive wheels removed.
Figure 8:
FIG. 8: shows a perspective view of a mobile chair apparatus as described herein, having drive wheels removed.
Figure 9:
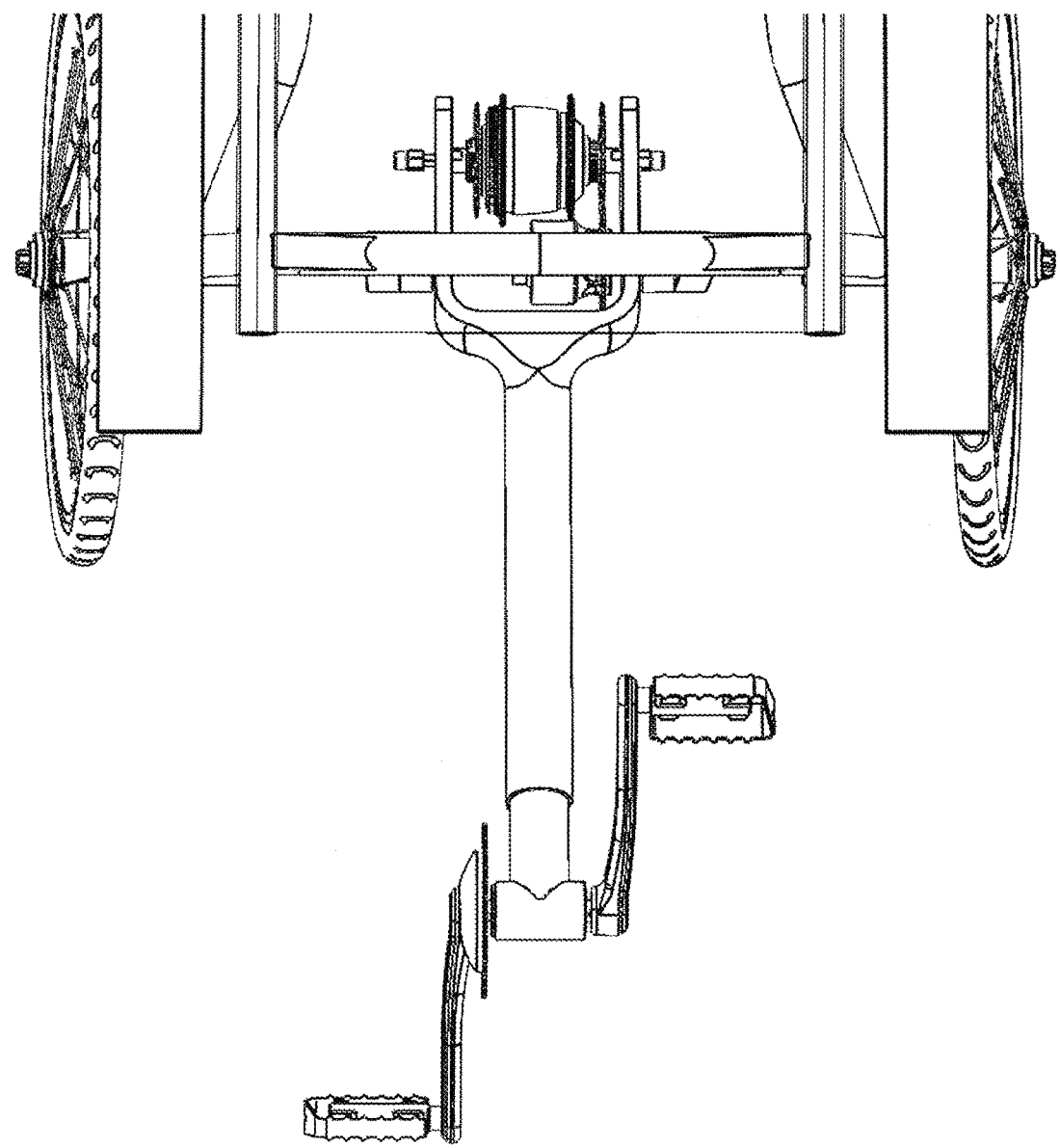
FIG. 9: shows a bottom, close-up view of an example of the drive assembly as described herein.

A mobile chair apparatus is described that comprises a drive assembly that preferably includes one or more moveable foot pedals, and a steering assembly, both of which concurrently enable an occupant user of the mobile chair apparatus to propel and to steer the mobile chair apparatus without assistance from another person. According to an embodiment of the present invention, a chair is mounted on a support frame having 4 wheels attached thereto, two wheels which are used for steering and form part of the steering assembly, and two drive wheels which form part of the drive assembly. The drive wheels rotate in response to rotation of foot pedals by the occupant of the Pedal Chair.

Terms

As used herein, and unless stated otherwise, each of the following terms shall have the definition set forth below.

As used herein, "about" in the context of a numerical value or range means±10% of the numerical value or range recited or claimed. By any range disclosed herein, it is meant that all hundredth, tenth and integer unit amounts within the range are specifically disclosed as part of the invention. Accordingly, "about" a recited value specifically includes that recited value. For example, an angle of about 90° refers to all angles within the range of ±10% of 90° including the angle of 90°.

As used herein, the term "outrigger" refers to any structural component for providing stability, other than the drive and steering wheels, which extends from the mobile chair apparatus and touches the ground when the mobile chair apparatus is positioned upright on a flat surface.

As used herein, support "shaft" refers to an elongated support structure. "Shaft" is being used herein as a term interchangeable with "beam" or "boom" commonly used in the art of mechanical engineering.

In the following drawings figures, like or corresponding elements presented in different drawing figures are identified using the same reference numeral.

With reference to FIGS. 1-19, an embodiment of the disclosed mobile chair apparatus (1) ("Pedal Chair") has a front end (1a), a rear end (1b), a top side (1c) and a bottom side (1d) and comprises:
 a) a steering assembly (10) comprising:
  i. a first armrest (101) connected to a first link arm (102), and a second armrest (103) connected to a second link arm (104), wherein the first and second armrests are preferably disposed on opposite sides of the mobile chair apparatus;
  ii. a first tie rod (105) connected to the first link arm (102) and a second tie rod (106) connected to the second link arm (104);
  iii. a first steering block (107) connected to the first tie rod (105) and a second steering block (108) connected to the second tie rod (106);
  iv. a third tie rod (109) interconnecting the first and the second steering blocks (107, 108); and
  v. a first steering wheel (110) and a second steering wheel (111) each located at the rear end (1b) of the mobile chair apparatus (1), the first and second steering wheels (110, 111) move in response to movement of one or both of the first and second armrests (101, 103), and
 b) a drive assembly (20) preferably comprising a pair of foot pedals (201), and
 c) a seat (301) which may be mounted on a chair frame, and optionally a seatback (302) attached to the seat (301) or the chair frame via a first pivot or hinge connection (303).

A separate embodiment of the Pedal Chair comprises,
 a) a steering assembly (10), and
 b) a drive assembly (20) comprising:
  i. a first drive wheel (202) and a second drive wheel (203) each connected to an axle (204), which axle can be common are separate;
  ii. a support shaft (205) having a distal end (205a) and a proximal end (205b), wherein the proximal end (205b) of the support shaft is preferably located on the bottom side (1d) of the mobile chair apparatus (1);
  iii. a pair of foot pedals (201) preferably connected to a pedal crank (206), which are preferably located at the distal end (205a) of the support shaft (205);
  iv. a gear hub (207) preferably located at the proximal end (205b) of the support shaft (205);
  v. a first chain (not shown in the figures for purposes of retaining clarity in the drawing figures, but to be understood as operatively) connecting the foot pedals (201) or the pedal crank (206) to the gear hub (207) whereby the chain transmits motive power from the foot pedals (201) or the pedal crank (206) to the gear hub (207); and
  vi. a second chain (also not shown in the figures for purposes of retaining clarity in the drawing figures) shorter in length than the first chain, said second chain (to be understood as operatively) connecting the gear hub (207) to the axle or axles (204), whereby the chain transmit motive power from the gear hub (207) to the axle or axles (204) or connecting components of the gear hub (e.g., 207a and 207b),
 c) a seat (301) which may be mounted on a chair frame, and optionally a seatback (302) attached to the seat (301) or the chair frame via a first pivot or hinge connection (303).

With further reference to FIGS. 20-24, a further embodiment of the disclosed mobile chair apparatus (1) has a front end (1a), a rear end (1b), a top side (1c) and a bottom side (1d) and comprises:
 a) a steering assembly (10) comprising:
  i. a first armrest (101) operably connected to a first link arm (102), and a second armrest (103) operably connected to a second link arm (104), wherein the first and second armrests are preferably disposed on opposite sides of the mobile chair apparatus;
  ii. a first steering tube (114) operably connected to the first link arm (102) and a second steering tube (115) operably connected to the second link arm (104);
  iii. a first gear assembly (116) operably connected to the first steering tube (114) and a second gear assembly (117) operably connected to the second steering tube (115);
  iv. a first steering wheel (110) operably connected to the first gear assembly (116) and a second steering wheel (111) operably connected to the second gear assembly (117), wherein the first and second steering wheels (110, 111) are located at the rear end (1b) of the mobile chair apparatus (1), and move in response to movement of one or both of the first and second armrests (101, 103), and
 b) a drive assembly (20) preferably comprising a pair of foot pedals (201), and
 c) a seat (301) which may be mounted on a chair frame, and optionally a seatback (302) attached to the seat (301) or the chair frame via a first pivot or hinge connection (303).

Figure 25:
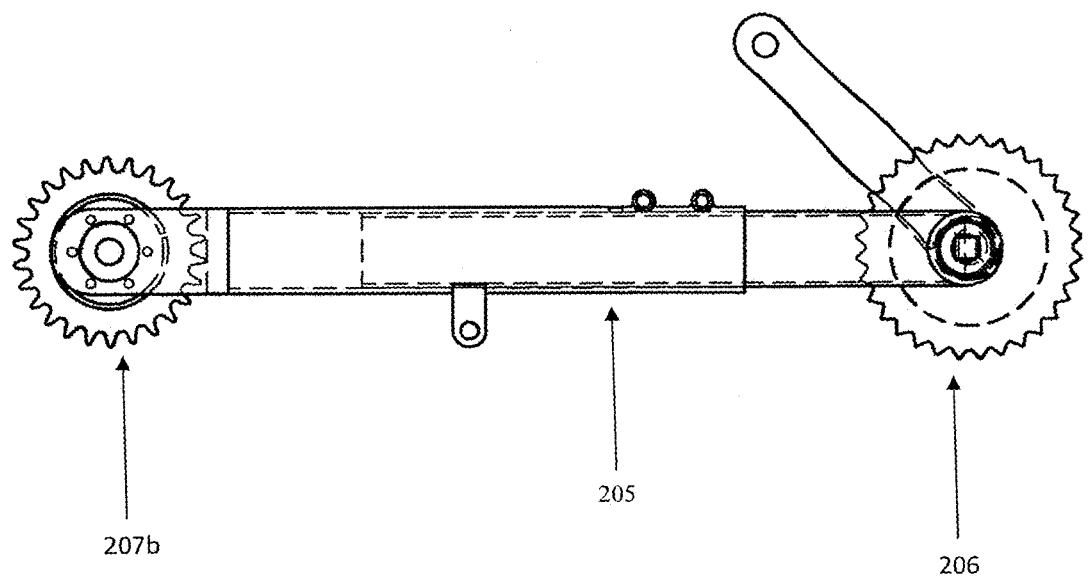
FIG. 25: shows a side view of an alternative arrangement for the drive assembly (20) described herein which design allows for the transfer of motion from the foot pedals to the drive wheels via a single chain operably connecting the crank and the axle. According to this design, a second chain and transmission (207a) are not required to transfer motion from the foot pedals to the drive wheels.

With further reference to FIG. 25, according to a further embodiment of the present invention, an alternative arrangement for the drive assembly (20) is provided which comprises: i. a first drive wheel and a second drive wheel each connected to an axle; ii. a support shaft having a distal end and a proximal end, wherein the proximal end of the support shaft is located on the bottom side of the mobile chair apparatus; iii. a pair of foot pedals connected to a crank located at the distal end of the support shaft; iv. a chain operably connecting the crank to the axle.

The specific steering and drive assemblies (10, 20) described above can operate independently of each other on a mobile chair apparatus. However, in a preferred embodiment of the present invention, a Pedal Chair is provided comprising both a steering assembly (10) and a drive assembly (20) as specifically described herein. In this embodiment, the first steering wheel (110) and a second steering wheel (111) are each located rearwardly from the first drive wheel (202) and a second drive wheel (203) and each of the first drive wheel (202) and a second drive wheel (203) preferably also being disposed on opposite sides of the mobile chair apparatus (1), in which the orientation of said the first drive wheel (202) and a second drive wheel (203) is controlled by the relative position of at least one of the first and/or second armrests (101, 103) or tillers (131).

The Steering Assembly (10)

The primary function of the steering assembly (10) is to convert movement of the first and/or second armrest (101, 103) to a pivoting motion of the first and the second steering wheels (110, 111).

Figure 18:
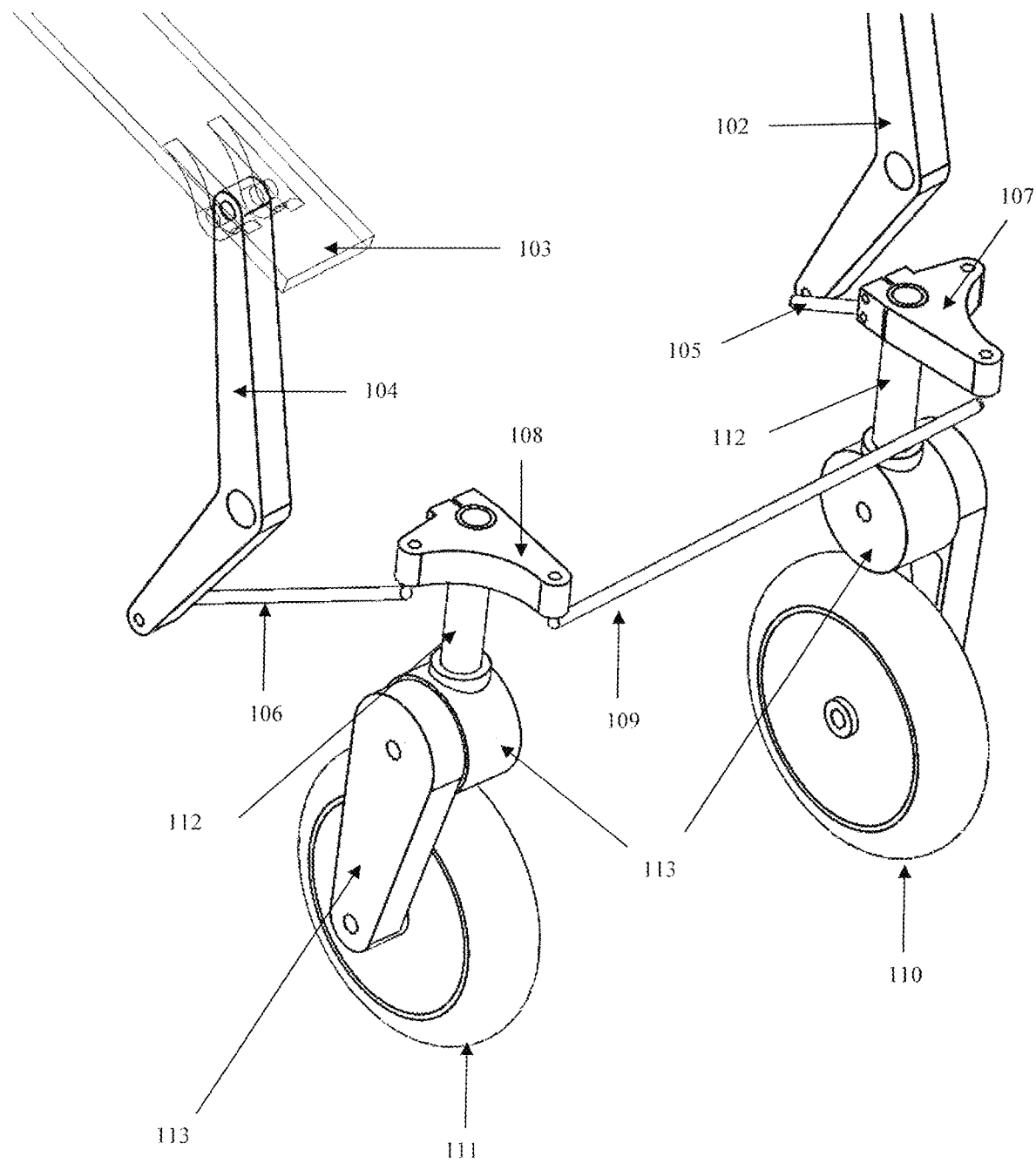
FIG. 18: shows a perspective, close-up view of an example of the steering assembly as described herein.
Figure 19:
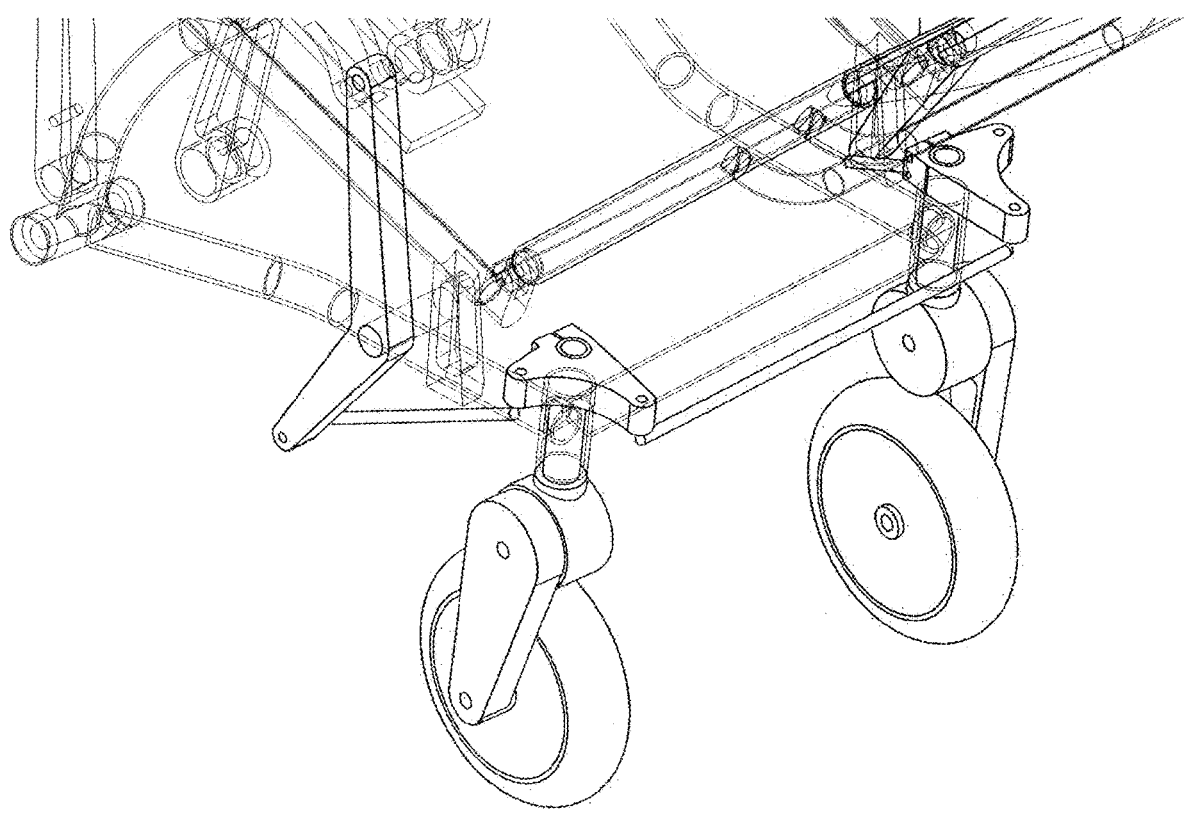
FIG. 19: shows a perspective, close-up view of an example of the steering assembly as described herein.
Figure 20:
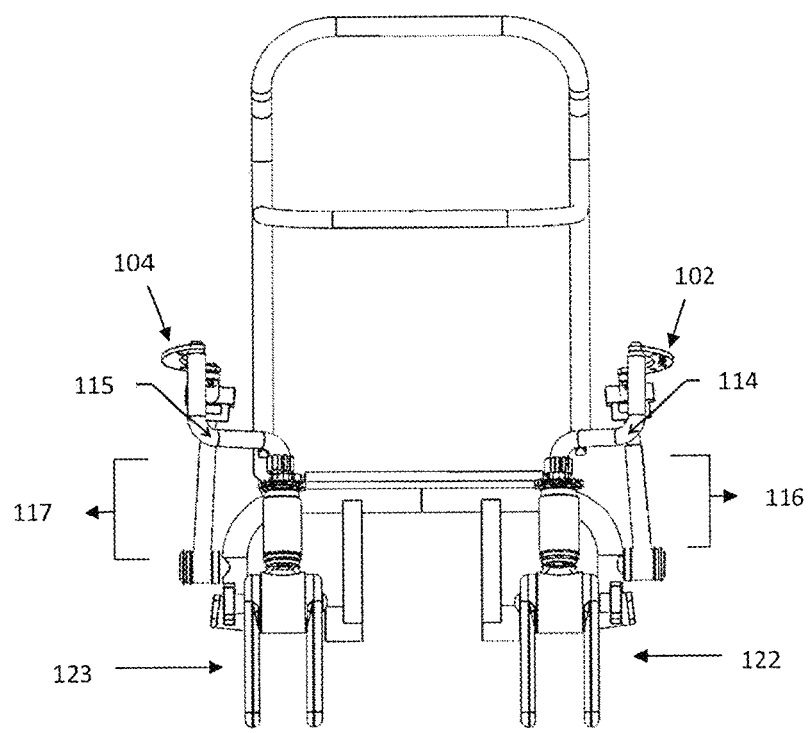
FIG. 20: shows a back view of a mobile chair apparatus comprising the alternative steering assembly arrangement as described herein.
Figure 21:
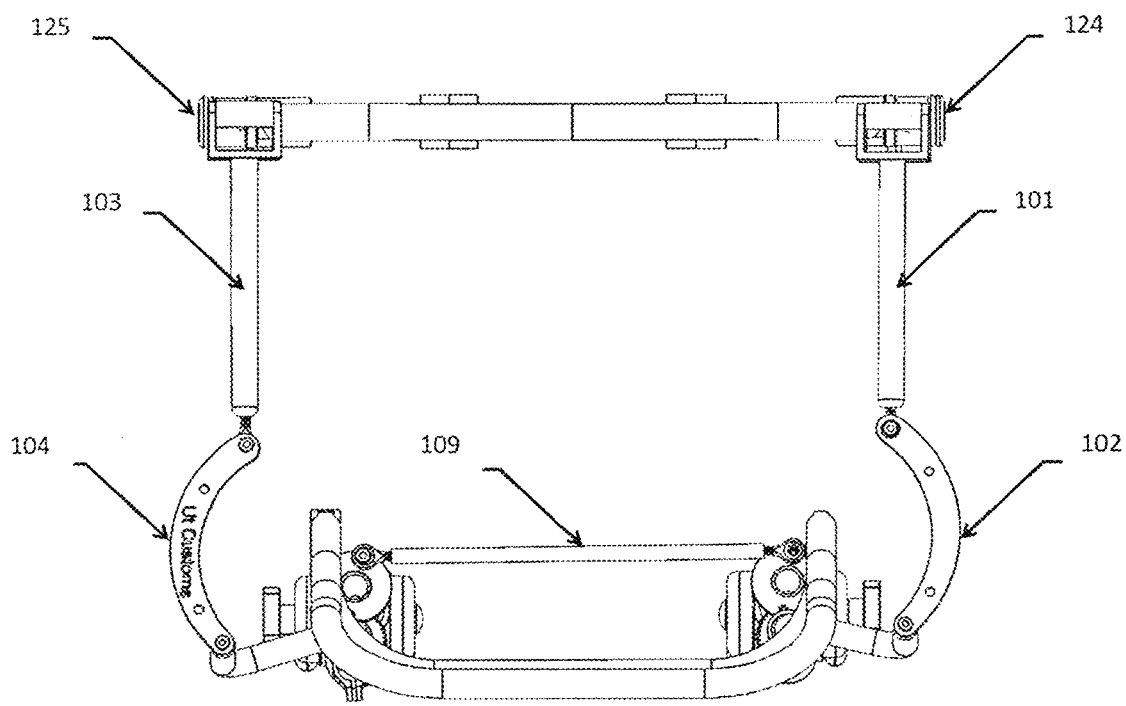
FIG. 21: shows a top view of a mobile chair apparatus comprising the alternative steering assembly arrangement as described herein. Seat (301) which may be mounted on a chair frame is not shown.
Figure 22A:
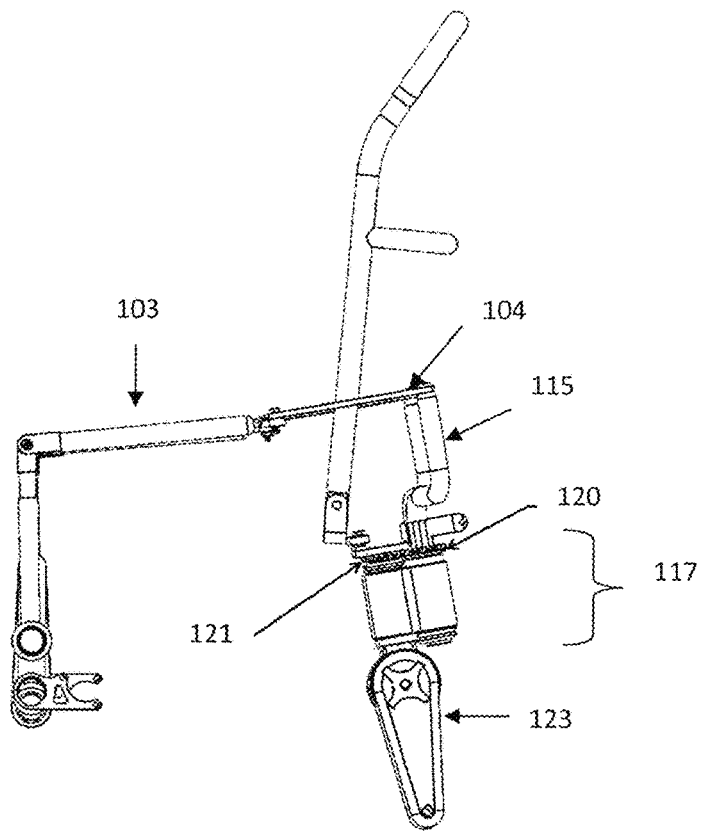
FIGS. 22A and 22B: show left side views of a mobile chair apparatus comprising the alternative steering assembly arrangement as described herein. Seat (301) which may be mounted on a chair frame is not shown in FIG. 22A.
Figure 22B:
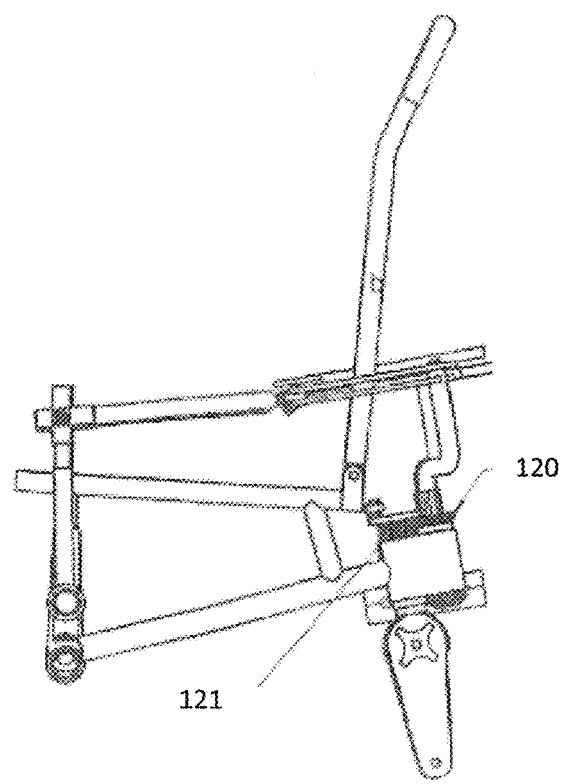
Figure 23A:
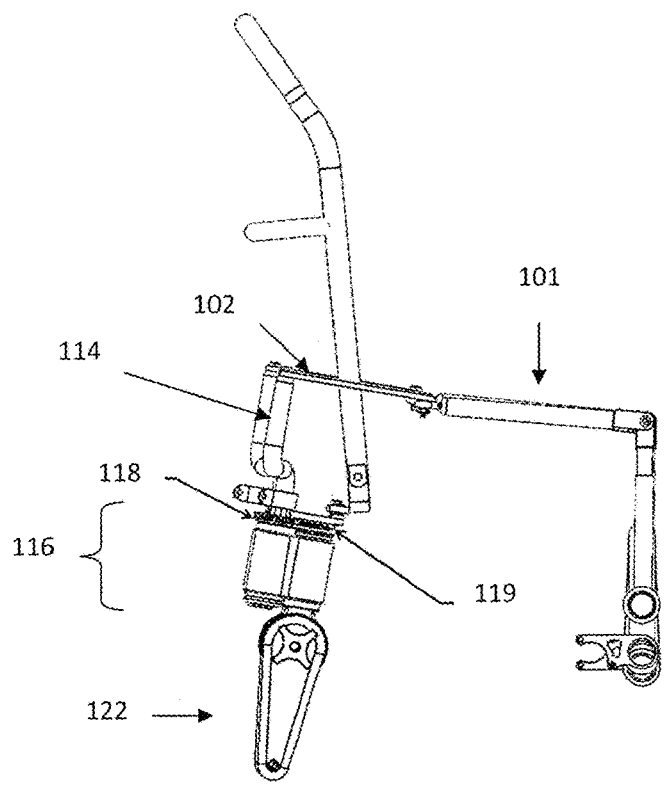
FIGS. 23A and 23B: show right side views of a mobile chair apparatus comprising the alternative steering assembly arrangement as described herein. Seat (301) which may be mounted on a chair frame and portions of the frame are not shown in FIG. 23A, so as to provide a clear view of the steering components in the steering assembly.
Figure 23B:
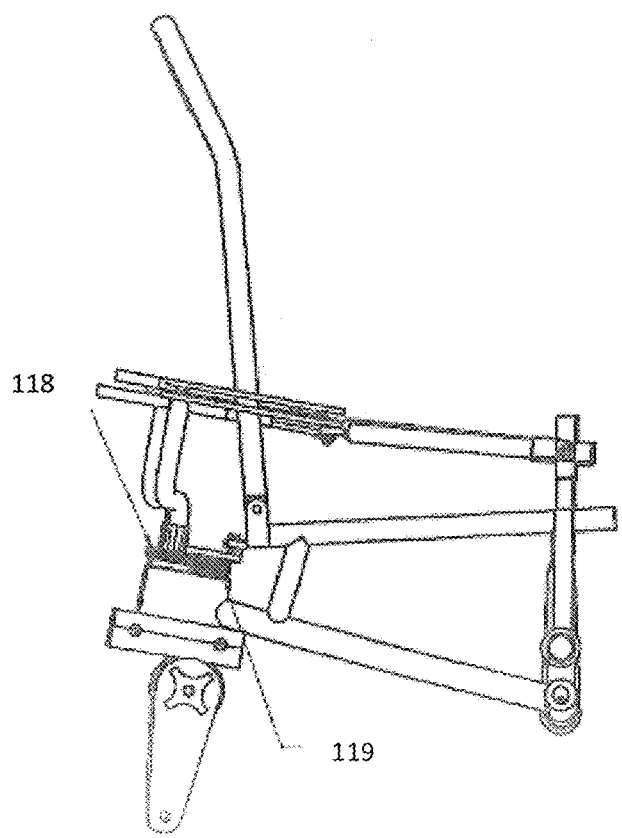

Referring to FIG. 18, an embodiment of the steering assembly (10) comprises: (i) a first armrest (101, not visible in FIG. 18 but seen in other figures) connected to a first link arm (102), and a second armrest (103) connected to a second link arm (104), wherein the first and second armrests are preferably disposed on opposite sides of the mobile chair apparatus; (ii) a first tie rod (105) connected to the first link arm (102) and a second tie rod (106) connected to the second link arm (104); (iii) a first steering block (107) connected to the first tie rod (105) and a second steering block (108) connected to the second tie rod (106); (iv) a third tie rod (109) interconnecting the first and the second steering blocks (107, 108); and (v) a first steering wheel (110) and a second steering wheel (111) each located at the rear end (1*b*) of the mobile chair apparatus (1). and preferably disposed on opposite sides of the mobile chair apparatus, and whose orientation relative to the drive wheels (202, 203) may be established by the relative positions of one or both of the first and second armrests (101, 103), and which orientation may be changed by changing the relative positions of one or both of the first and second armrests (101, 103). The first and second steering wheels move in response to movement of one or both of the first and second armrests (101, 103).

The two armrests (101, 103), the two link arms (102, 104) the two steering blocks (107, 108) and the three tie rods (105, 106 and 109) together form an interconnected system that ensures sliding movement of either armrest by an occupant user translates into corresponding movement of both steering wheels (110, 111). With this configuration, the Pedal Chair can be steered by using either arm, without use of working fingers. The turning radius of the rear two steering wheels is advantageously at least about 90° of arc, but greater (viz. to about 180° of arc) or lesser degrees of motion, but preferably at least about 10° of arc are also considered to be within the scope of this invention. With this design, the Pedal Chair can virtually turn within its own diameter. A suitable size for the drive wheel is about 8 inches in diameter, but larger or smaller sizes are also easily used in the invention, In use, the occupant user rests one or both arms on the chair armrests, and steers the Pedal Chair by moving either arm, for instance forwardly and/or rearwardly, resulting in movement of armrests (101, 103) on both sides of the chair due to the mechanical interconnections of the several elements making up the steering assembly (10). The relative position of an armrest (101, 103) establishes the relative position of its tie rod (105, 106) connected to its steering block (107, 108), and in turn establishes the position or orientation of each steering wheel (110, 111) attached to an individual steering block (107, 108). In an embodiment, the steering wheels (110, 111) are attached to steering blocks (107, 108) via a steering wheel rod (112) and one or more steering wheel support component (113). According to this design, the movement of steering block (107, 108) is transferred to the steering wheel by rotation of the steering wheel rod and the one or more steering wheel support component. In the figures the steering wheel support components (113) are depicted on only the outside of the steering wheel. However, embodiments where one or more support components are located on the inside or both sides of the steering wheel are envisioned to be within the scope of the present invention.

Movement of the armrests (101, 103) thereby imparts direct control over the steering wheels (110, 111) and the ability for the Pedal Chair to turn. By sliding even one of the armrests (101, 103) in the direction of travel desired, a user causes the rear wheels to turn in that direction and thereby providing steering control.

In a separate embodiment of the present invention, and with reference to FIGS. 20-24 in particular, an alternative arrangement for the steering assembly (10) is provided comprising (i) a first armrest (101) operably connected to a first link arm (102), and a second armrest (103) operably connected to a second link arm (104), wherein the first and second armrest are preferably disposed on opposite sides of the mobile chair apparatus; (ii) a first steering tube (114) operably connected to the first link arm (102) and a second steering tube (115) operably connected to the second link arm (104); (iii) a first gear assembly (116) operably connected to the first steering tube (114) and a second gear assembly (117) operably connected to the second steering tube (115); and (iv) a first steering wheel (110) operably connected to the first gear assembly (116) and a second steering wheel (111) operably connected to the second gear assembly (117), wherein the first and second steering wheels (110, 111) are located at the rear end (1*b*) of the mobile chair apparatus (1), and move in response to movement of one or both of the first and second armrests (101, 103).

In the alternative arrangement for the steering assembly (10) discussed above, the mobile chair apparatus (1) is steered via movement of one or both of the first and second armrests (101, 103), each of said first and second armrests (101, 103) being connected to a respective "steering wish bone", also referred to herein as the first and second link arms (102, 104), which first and second link arms (102, 104) turn the first and second steering tubes (114, 115). This arrangement allows turning of the first and second steering tubes (114, 115) left and right with respect to their longitudinal axis.

The first and second steering tubes (114, 115) are operably connected to the first and second gear assemblies (116, 117), respectively. Preferably, the first and second gear assemblies (116, 117) each comprises at least two gears, more preferably at least a large gear (118, 120) and a small gear (119, 121) (i.e., the 2 gears are of different sizes), and the first steering tube (114) operably connects to one of the at least two gears in the first gear assembly (116), which one of the at least two gears in the first gear assembly (116) in turn operably connects to, and turns, the other of the at least two gears in the first gear assembly (116).

For example, in an embodiment the first steering tube (114) has a large gear (118) mounted thereon, which in turn intermeshes and turns a small gear (119), which small gear (119) is mounted to shaft which rotates a first wheel dropout (122) on one side of the Pedal Chair, which first wheel dropout (122) is operably connected to the first steering wheel (110). Rotation of the first wheel dropout (122) left or right provides turning to the first steering wheel (110).

A skilled person in the art would readily recognize that analogous linkage arrangement comprising the second armrest (103), the second link arm (104), the second steering tube (115), the second gear assembly (117), a second wheel dropout (123) which is operably connected to the second steering wheel (111), can be used on the other (opposite) side of the Pedal chair.

In a further embodiment, a connecting tie rod (109) is connected to the first and second gear assemblies (116, 117), or the pair of large gears (118, 120), or the pair of small gears (119, 121), or the wheel dropouts (122, 123) or steering wheels (110, 111) on two sides of the Pedal Chair such that movement of either armrest (101 or 103) will turn both steering wheels (110, 111).

This alternative steering assembly arrangement allows for turning of the steering wheels (110, 111) when the Pedal Chair is not in motion. The ability to reset the steering wheels (110, 111) while the mobile chair apparatus is stopped is an important advantage of the Pedal Chair as described herein.

Figure 24:
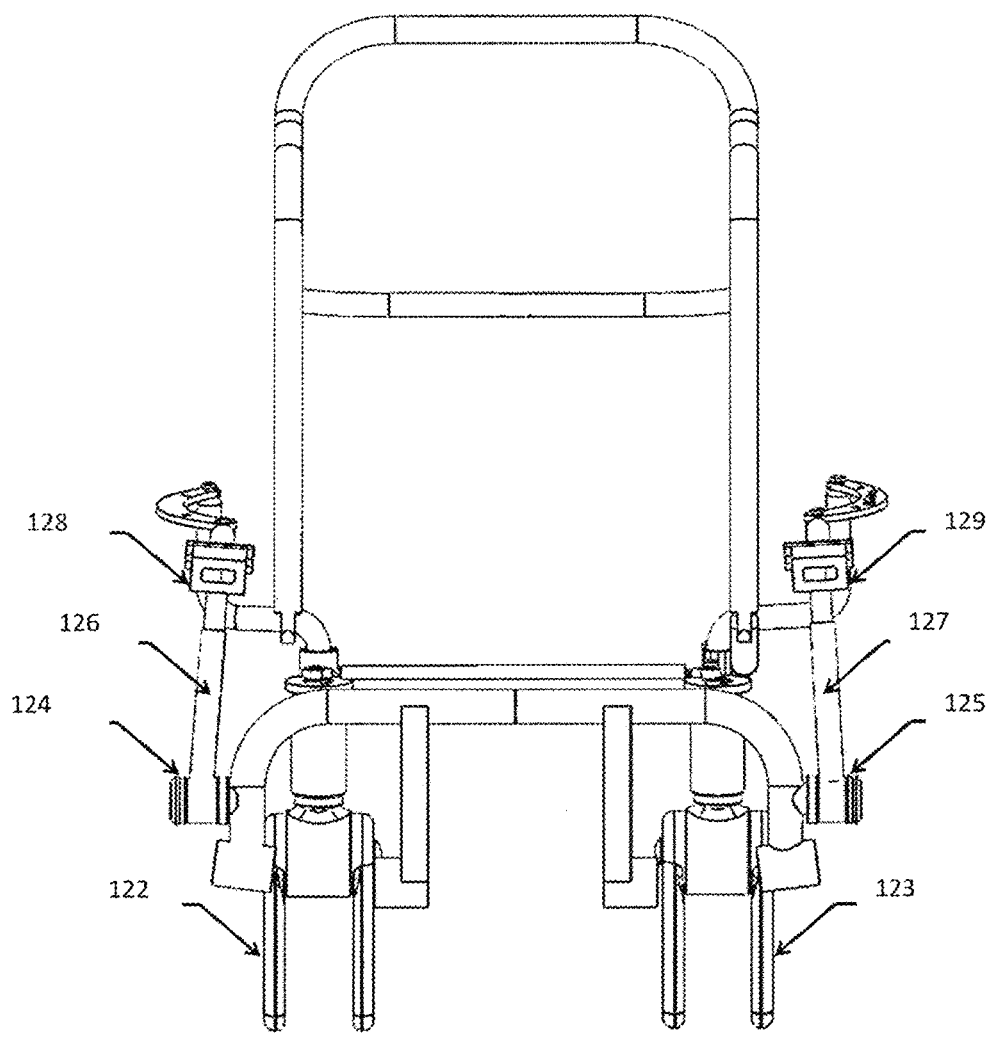
FIG. 24: shows a front side view of a mobile chair apparatus comprising the alternative steering assembly arrangement as described herein. Seat (301) which may be mounted on a chair frame is not shown.

With reference to FIGS. 21-24 in particular, it can be seen that the front of armrests (101, 103) are attached to a support arm assembly. The support arm assembly pivots at the frame attachment and the armrest to allow for movement of the armrest. Hinged support arms (not shown in FIG. 21) are attached to the frame via pivot points shown in FIG. 21 (124, 125). FIG. 24 shows the support arms (126,127), the pivot point attached to the frame (124,125) and the support arm pivot attachment to the armrest (128, 129).

With reference to FIGS. 26-36, according to further alternative steering assembly designs (the tiller steering designs), the VeloChair can be steered with forward or backward movement of one or more tillers (131) on one or both sides of the VeloChair. The tiller steering designs generally comprise at least one and optionally two tillers (131) operably connected to the first and the second steering wheels (110, 111), which steering wheels (110, 111) are operably connected to each other, so as to allow forward and backward movement of the one or pair of tillers (131) to be translated into left and right turning/pivoting motion of the steering wheels (110, 111) to provide for steering of the VeloChair. The at least one and optionally two tillers (131) and the first and the second steering wheels (110, 111) may be operably connected via one or more of the following: tiller receiving sockets, link arms, steering tubes, steering tube shafts, steering tube gears, intermediate gears, pivots such as steering arm pivots and swivel arm pivots, connecting tie rods, steering wheel mounts (also referred to herein as dropouts). As would be appreciated by those skilled in the mechanical arts, it is not necessary to use all of the above-listed components to form a functional and operable connection of the tiller or tillers (131) to the steering wheels (110, 111). Moreover, more than one of any single type of the above-listed components may be used.

Figure 29:
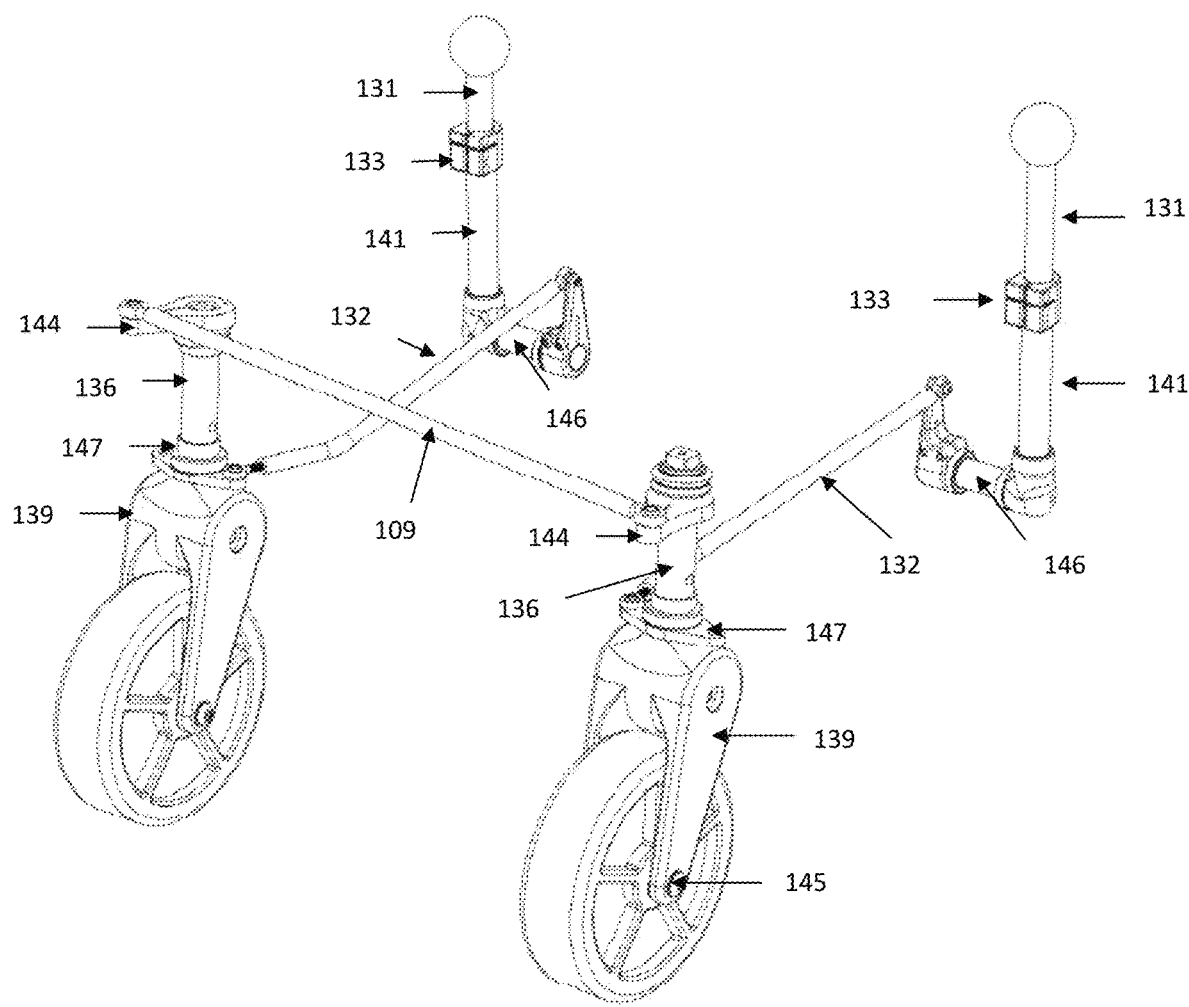
FIG. 29: shows a perspective view of a fourth alternative arrangement for the steering assembly (10), which includes a tiller (tiller steering design).
Figure 30:
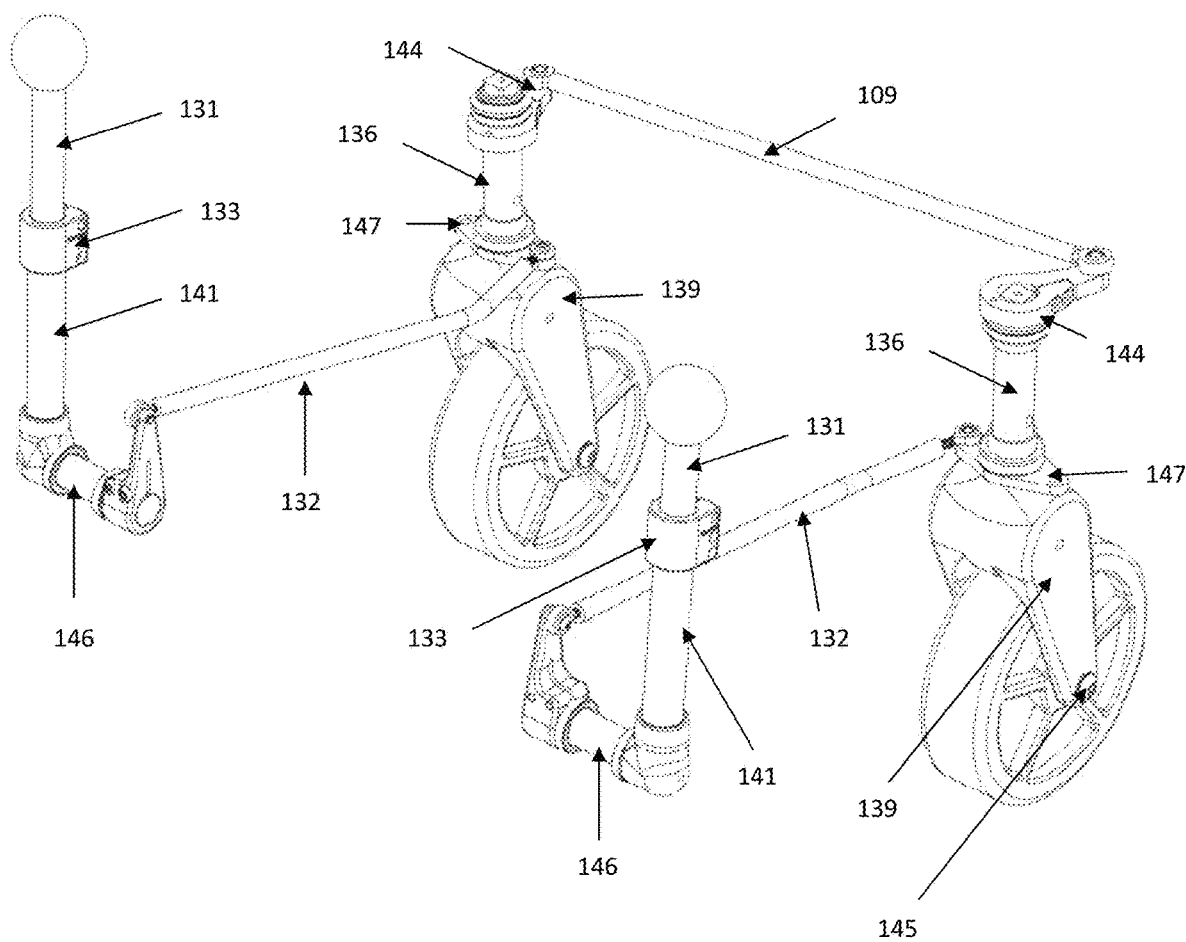
FIG. 30: shows another perspective view of the fourth alternative arrangement for the steering assembly (10), which includes a tiller (tiller steering design).
Figure 31:
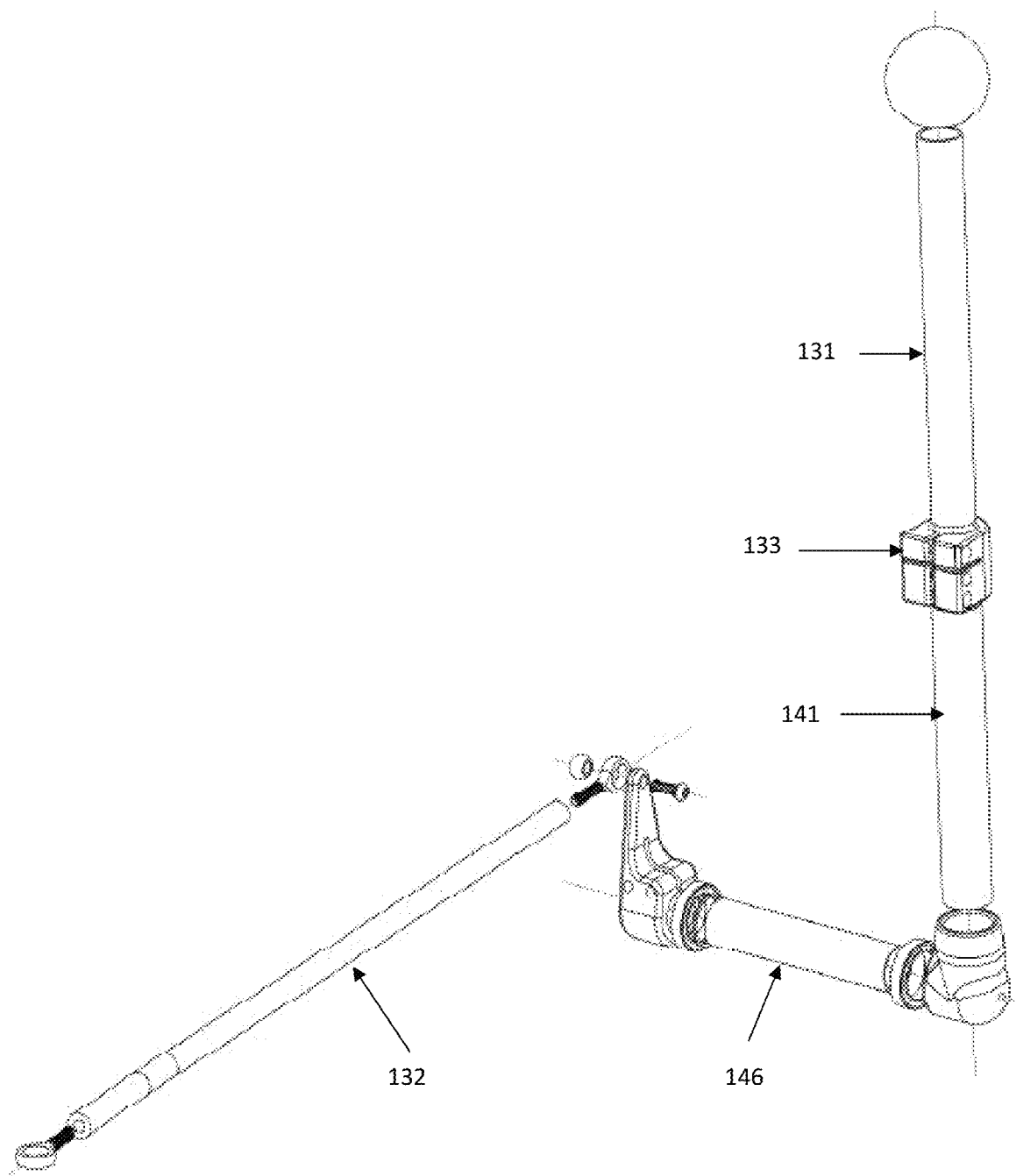
FIG. 31: shows a close-up and exploded view of the front portion of the fourth alternative arrangement for the steering assembly (10), which includes a tiller (tiller steering design).
Figure 32:
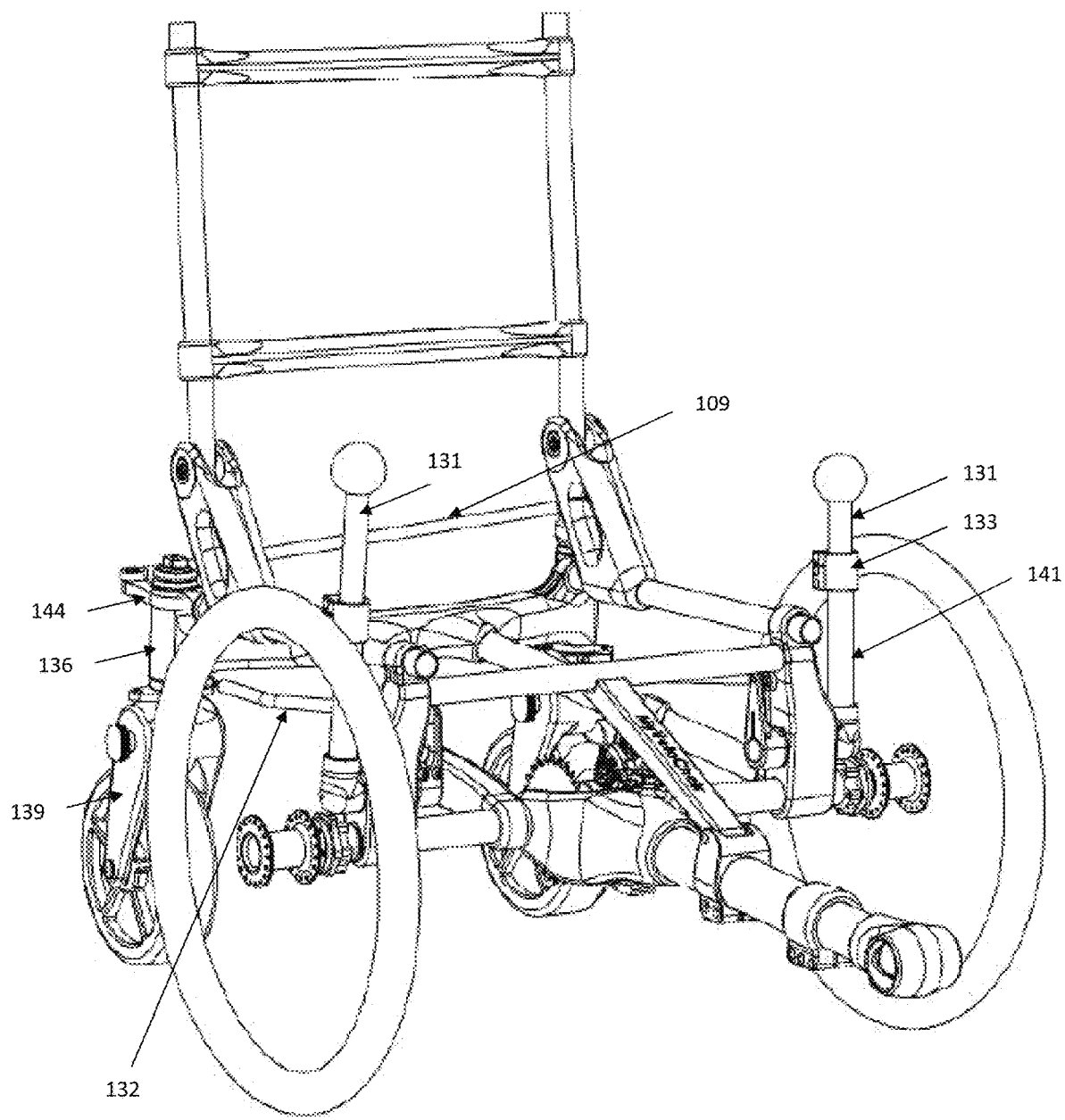
FIG. 32: shows a perspective view of a mobile chair apparatus as described herein, having a fourth alternative arrangement for the steering assembly (10), which includes a tiller (tiller steering design).
Figure 33:
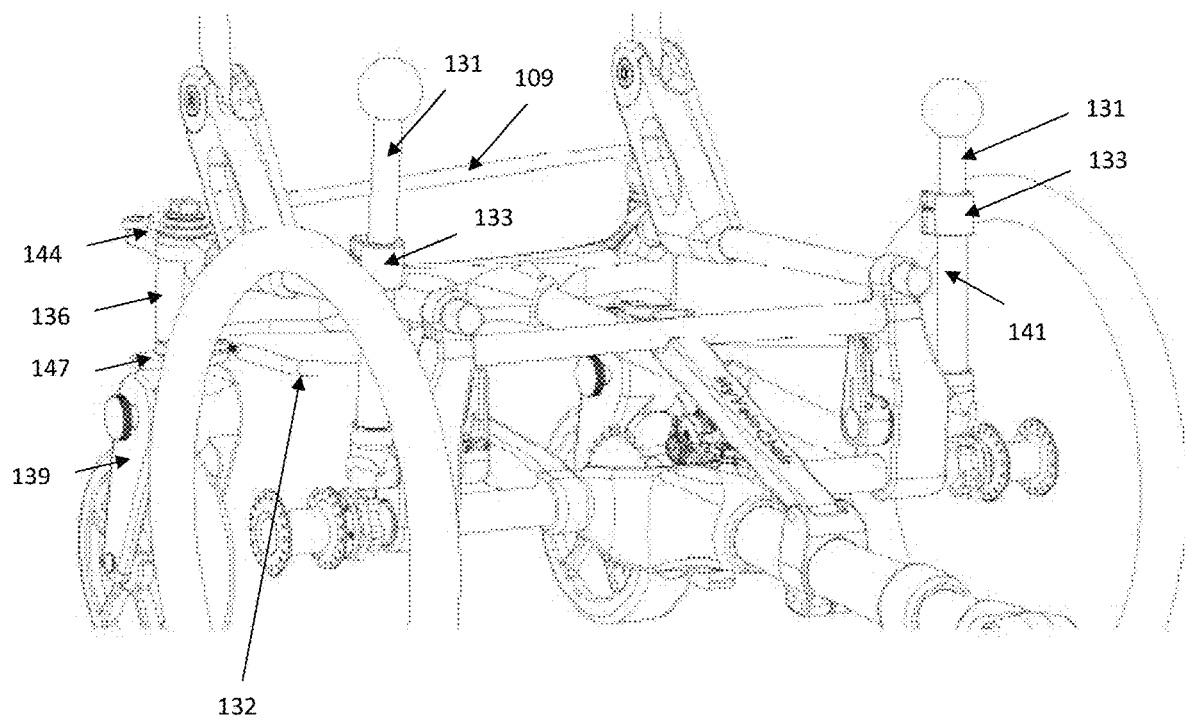
FIG. 33: shows a close-up view of a mobile chair apparatus as described herein, having a fourth alternative arrangement for the steering assembly (10), which includes a tiller (tiller steering design).
Figure 34:
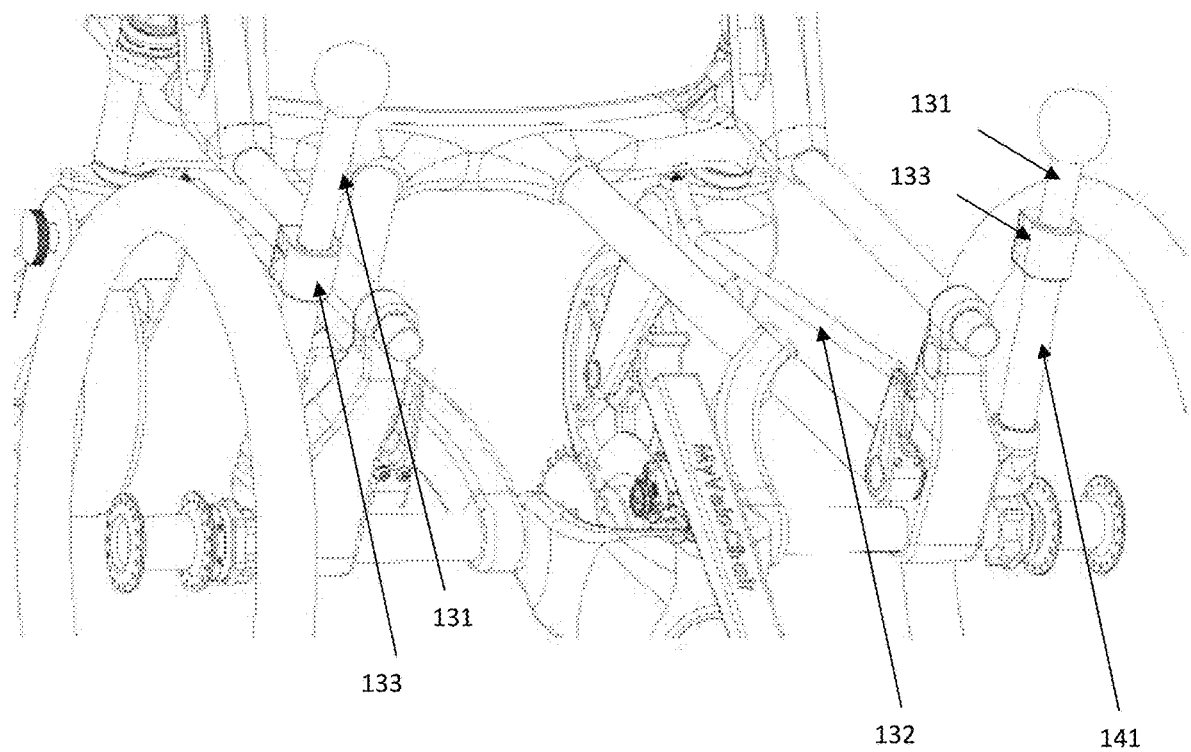
FIG. 34: shows another close-up view of a mobile chair apparatus as described herein, having a fourth alternative arrangement for the steering assembly (10). which includes a tiller (tiller steering design).
Figure 35:
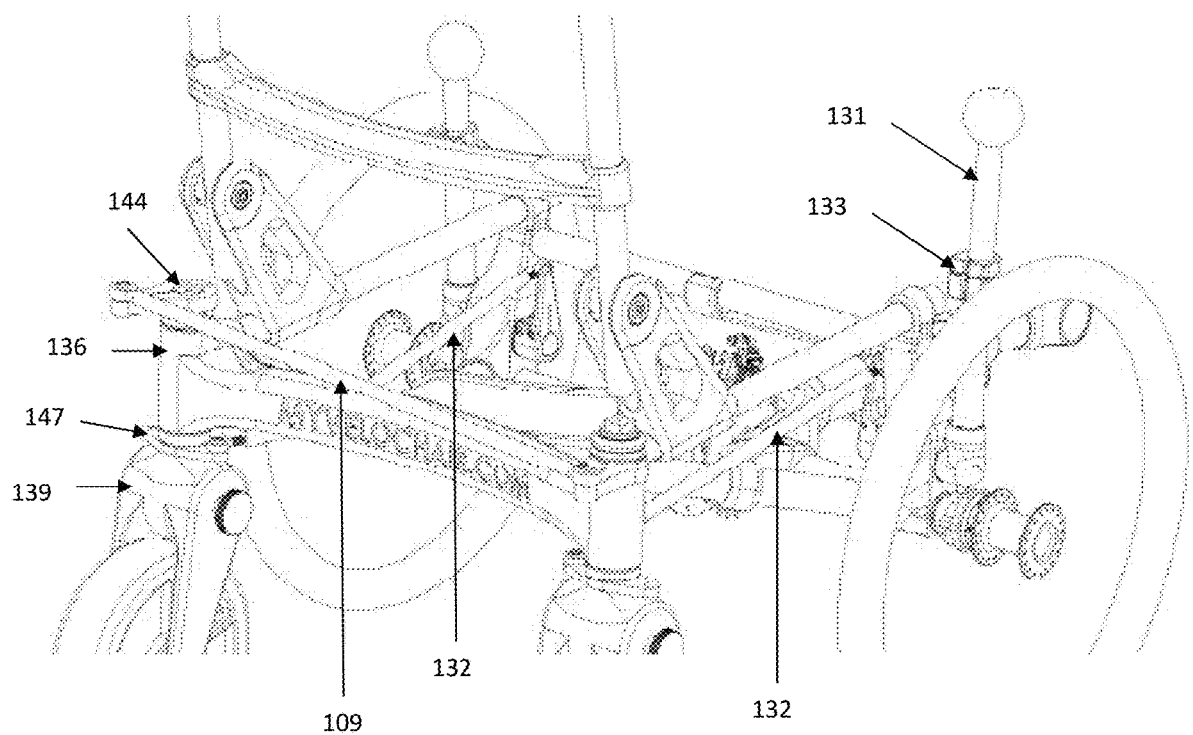
FIG. 35: shows another close-up view of a mobile chair apparatus as described herein, having a fourth alternative arrangement for the steering assembly (10), which includes a tiller (tiller steering design).
Figure 36:
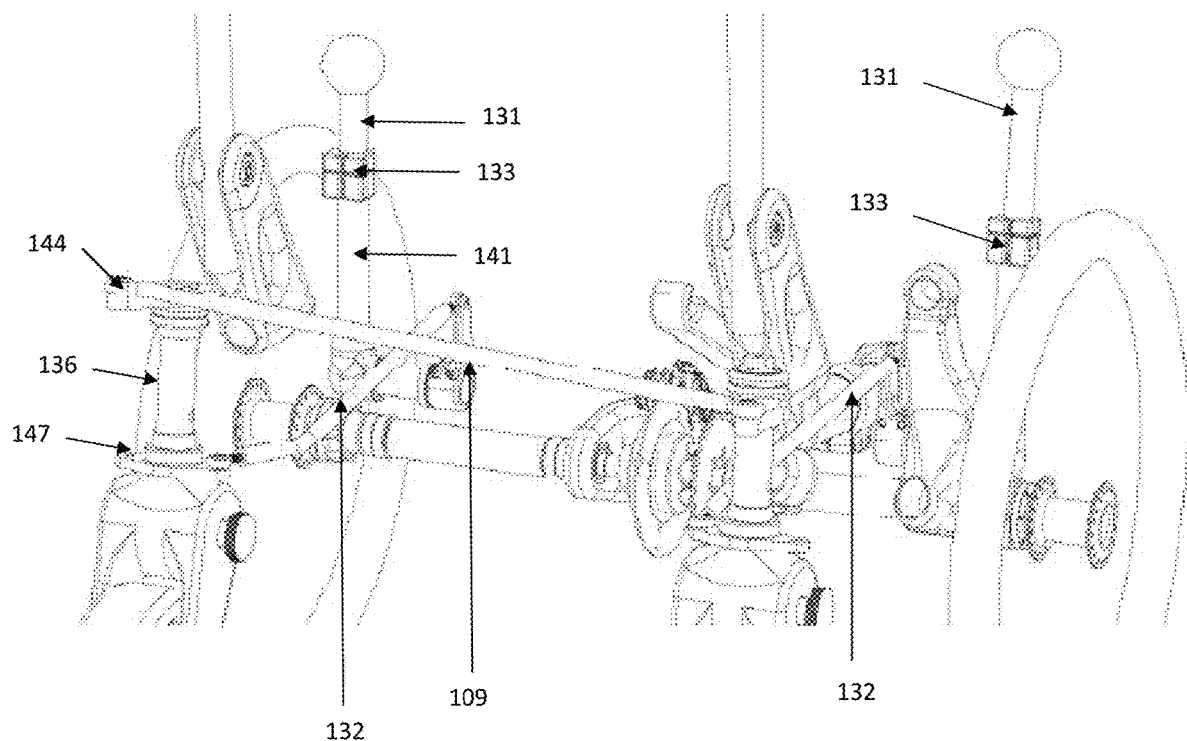
FIG. 36: shows another close up view of a mobile chair apparatus as described herein, having a fourth alternative arrangement for the steering assembly (10), which includes a tiller (tiller steering design).

Optionally the tiller(s) (131) can be a tube fitted with a separate piece such as a ball mounted thereon at one end for easy grasping (as shown in, e.g., FIG. 29). The tiller can be in the form of a tiller tube which slides into a receiving socket (133) that allows the height of the tiller (131) to be adjusted by sliding the tiller (131) up and down in a front steering tube (141) or completely removed for ease of side entry or exit.

In an embodiment of the tiller steering design, the tiller(s) (131) are each operably connected to the corresponding steering wheels (110, 111) via at least one (rear) steering tube (136), which is preferably located close to the steering wheels (110, 111), and preferably located above the steering wheels (110, 111). The tiller(s) (131) may be connected to the (rear) steering tube(s) (136) via linking components, for example one or more of a link arm, one or more of a tie rod, one or more steering gear, and/or bearings which connect said components. Optionally, the (rear) steering tube (136) has a steering tube shaft (135) inserted therein, and/or gears and/or pivots directly or indirectly connected thereto. The (rear) steering tube (136) and/or one or more associated components for example steering tube shaft (135), swivel arm pivot(s) (144), steering arm pivot(s) (147), and/or steering tube gear(s) (142) may facilitate translation of the back and forward motion of the one or both tillers (131) to the left and right turning motion of the steering wheels (110, 111).

In another embodiment of the tiller steering design, one or more components of the steering assembly located on the rights side of the VeloChair is connected to one or more components of the steering assembly located on the left side of the VeloChair, so as to connect the motions of the two steering wheels, such that movement of just one tiller (131) will result in movement of both steering wheels (110, 111). In an embodiment, the connected elements are corresponding elements located on opposite sides of the VeloChair. In another embodiment, the connection is via a rear connecting tie rod (109). In yet another embodiment, the rear connecting tie rod (109) interconnects the corresponding rear steering tubes (136), the swivel arm pivots (144) or the steering arm pivots (147).

As shown in FIGS. 26-36, the first and second corresponding steering components recited herein, when both are present, can be preferably disposed on opposite sides of the VeloChair, specifically, one set to the left side of the VeloChair and the other set to the right. Where the second tiller is not provided however, the corresponding second receiving socket (133), front steering tube (141), small link arm (146) and side tie rod (132) can be absent.

Figure 26:
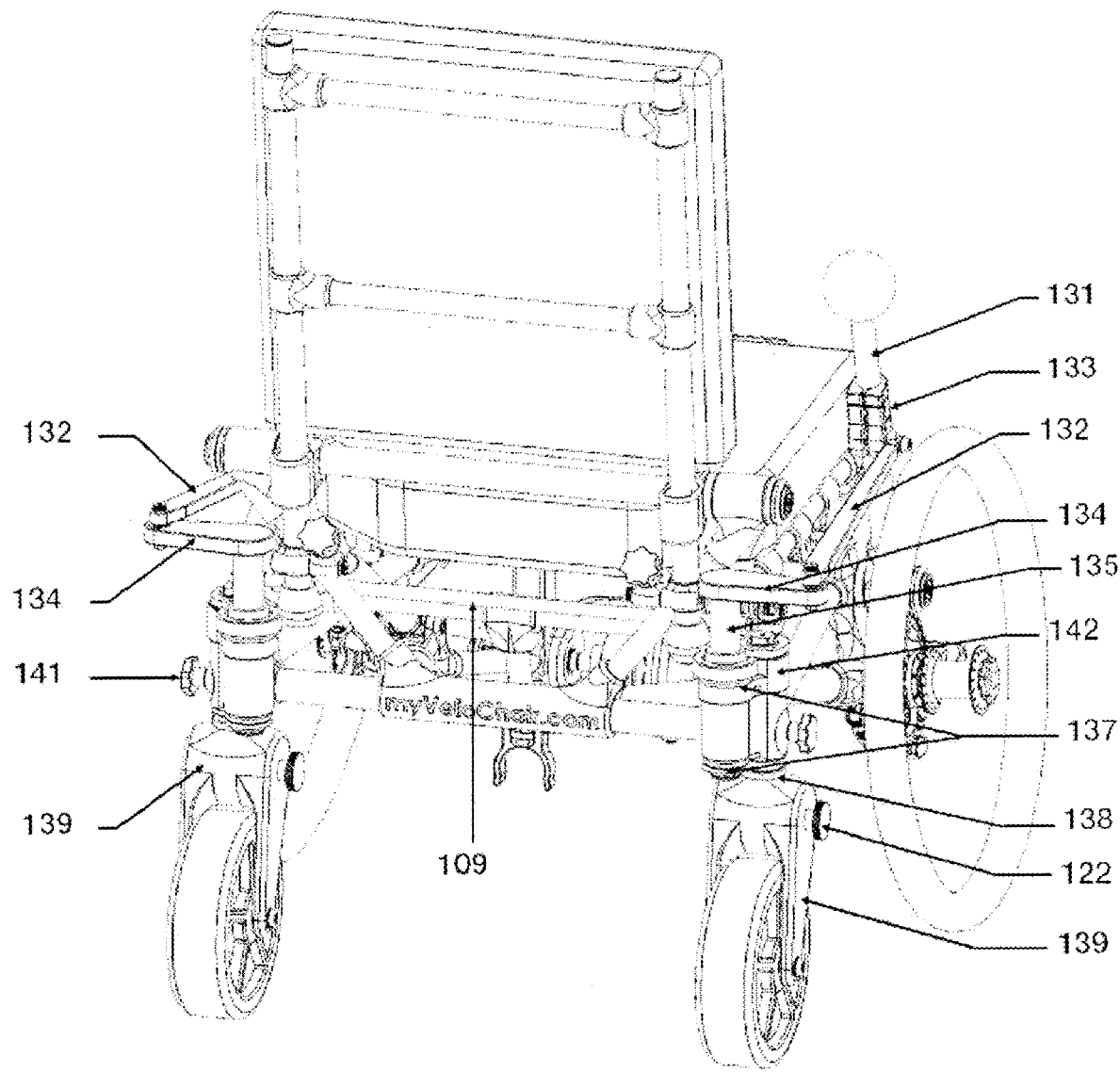
FIG. 26: shows a perspective view of a mobile chair apparatus as described herein, having a third alternative arrangement for the steering assembly (10), which includes a tiller (tiller steering design).
Figure 27:
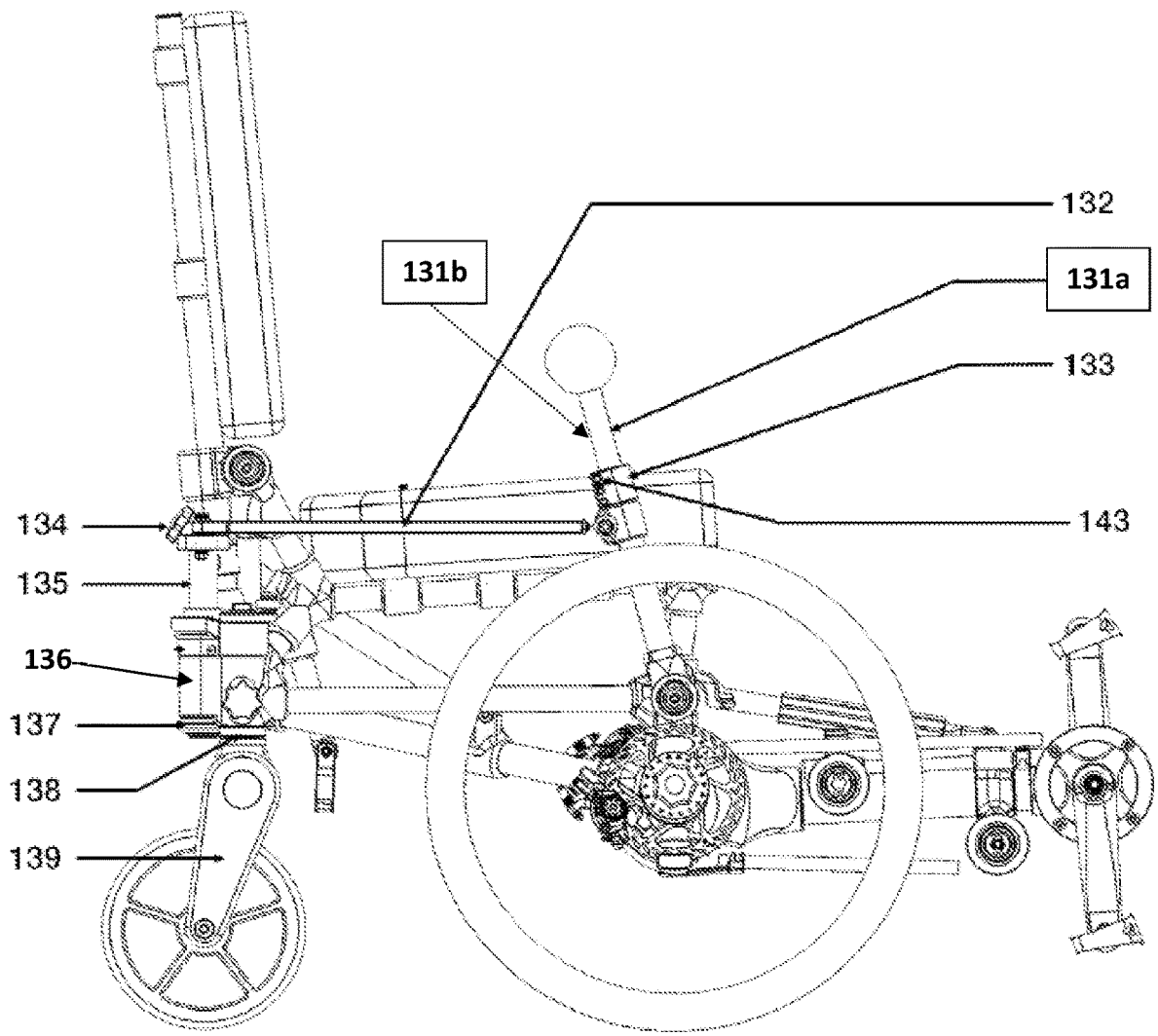
FIG. 27: shows a side view of a mobile chair apparatus as described herein, having a third alternative arrangement for the steering assembly (10), which includes a tiller (tiller steering design).
Figure 28:
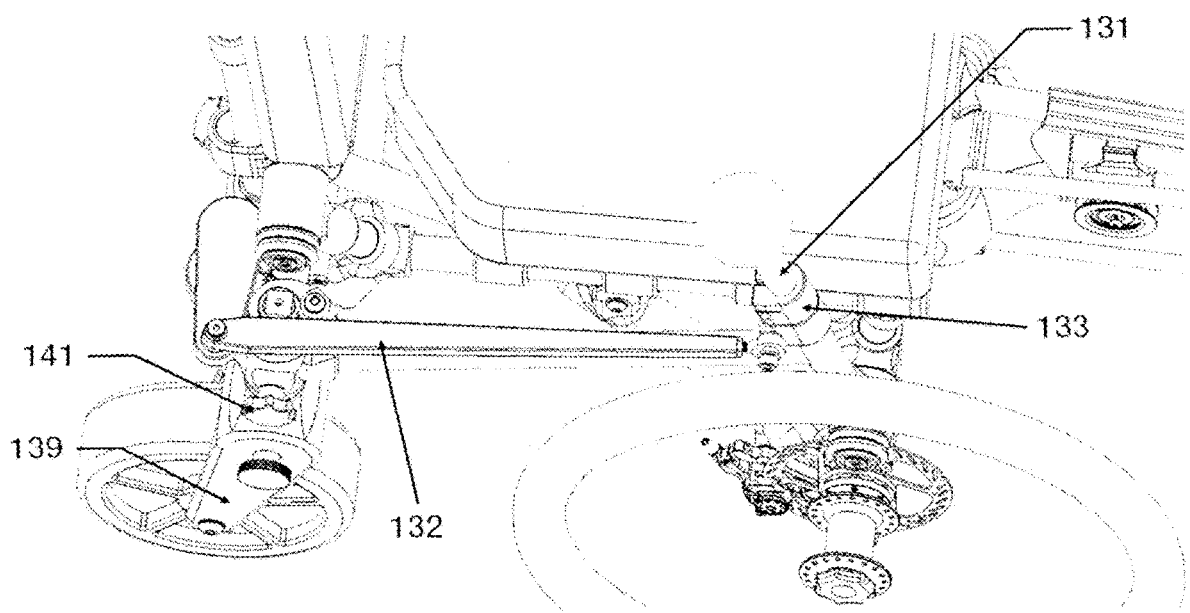
FIG. 28: shows a close-up view of a mobile chair apparatus as described herein, having a third alternative arrangement for the steering assembly (10), which includes a tiller (tiller steering design).

With reference to FIGS. 26-28 specifically, according to a third alternative steering assembly design (a particular embodiment of the tiller steering design), the steering assembly (10) comprises a first set of steering components comprising (i) a first tiller (131), (ii) a first large link arm (132), (iii) a first steering tube (136), (iv), a first steering tube shaft (135), (v) a first steering tube gear (142), (vi) a first steering wheel (110), and a second set of steering components comprising (vii) optionally a second tiller (131), (viii) a second large link arm (132), (ix) a second steering tube (136), (x), a second steering tube shaft (135), (xi) a second steering tube gear (142), (xii) a second steering wheel (111). The steering assembly (10) further comprises a connecting tie rod (109) interconnecting one or more of the first set of steering components to one or more of the second set of steering components so that moving just one of the two tillers (131) forward or backward will turn both steering wheels (110, 111) simultaneously.

Further, the VeloChair can configured such that:
(1) the first large link arm (132) is connected to the first tiller (131), preferably via a first tiller receiving socket (133); and
(2) the first steering tube (136) has the first steering tube shaft (135) inserted therein, and said first steering tube shaft (135) is operably connected to the first large link arm (132), preferably via a first small link arm (134); and
(3) the first steering gear (142) is operably connected to or mounted to the first steering tube shaft (135), optionally via a first intermediate gear (137), which first intermediate gear (137) can be mounted on the first steering tube (136); and
(4) The first steering gear (142) rotates the first steering wheel (110) left or right, preferably via the first wheel dropout (122), to provide turning to the first steering wheel (110), (5) the second set of components comprising a second large link arm (132), a second steering tube (136), a second steering tube shaft (135), a second steering gear (142), a second steering wheel (111), and optionally, a second tiller receiving socket (133), a second small link arm (134), a second wheel drop out (123), and a second intermediate gear (137), (6) a connecting tie rod (109) interconnecting one or more of the first set of steering components to one or more of the second set of steering components, preferably by connecting the first and the second small link arms (134), so that moving just one of the two tillers (131) forward or backward will turn both steering wheels (110, 111) simultaneously.

According to a particularly preferred embodiment the Velo-Chair is steered by forward or backward movement of the tiller (131) on either or both sides simultaneously, which tiller or tillers (131) is connected to the large link arm (132) on both sides. The tillers (131) are attached to the VeloChair with the tiller receiving sockets (133) connected to the large link arms (132). The large link arms (132) are connected via small link arms (134) to the top of the steering tube shaft (135) inserted to the steering tube (136) left and right for either side. The steering tube (136) has an intermediate gear (137) mounted on it which turns the first steering tube gear (136). This first steering tube gear (136) is mounted to a shaft which rotates the wheel dropouts (122, 123) left or right to provide turning to the steering wheels (110, 111). Both left and right small link arms (134) are connected via the connecting tie rod (109) so that moving just one of the two tillers (131) forward or backward will turn both steering wheels (110, 111) simultaneously. The tiller or tillers (131) are configured to be easily removable for ease of side sitting transfer in or out of the VeloChair. The tiller or tillers (131) are also configured to be adjustable in height to accommodate more or less force to steer. The height can be adjustable using a clamping knob (143) located in the tiller receiving sockets (133). The steering wheels (110, 111) can each include a screw type knob (141) either of which can be used to lock the steering wheels (110, 111) into a straight position if desired for ease of folding the VeloChair.

With reference to FIGS. 29-36 specifically, according to a fourth alternative steering assembly design (another particular embodiment of the tiller steering design), when either one or both of the tillers (131) is moved in a forward or backward direction, a front steering tube (141) moves in the same direction.

The front steering tube (141) is mounted on a frame and connects on the inside of the frame to a small link arm (146). This small link arm (146) is attached (optionally via bearing) to a side linking component such as the side link arm or side tie rod (132) which preferably but not necessarily runs under the chair seat (301) and connects (optionally via another bearing) to a steering arm pivot (147) at the bottom of a rear steering tube (136). The rear steering tube (136) has an additional swivel arm pivot (144) at the top of the rear steering tube (136) that moves with the movement of the steering arm pivot (147) at the bottom. The top swivel arm pivot (144) is connected with a rear connecting tie rod (109) to the opposite side rear steering tube (136) so that movement of one tiller (131) on either side will simultaneously force the other side tiller (131) to move. This setup allows for steering from either arm or both arms if desired.

The rear steering tubes (136) on both sides are optionally operably connected to a steering wheel mount (139) to hold the steering wheel (110, 111) which is attached to the steering wheel mount) 130 via a small axle (145). Further optionally, the steering wheels (110, 111) and steering wheel mounts (139) are vertically mounted and allow the steering wheels (110, 111) to be mounted perpendicular to the ground or angled if desired.

Accordingly, in this embodiment the steering assembly (10) comprises a first set of steering components comprising
  (i) a first tiller (131),
  (ii) optionally a first front steering tube (146),
  (iii) optionally a first small link arm (141),
  (iv) a first side linking component such as a link arm or preferably a side tie rod (132),
  (v) a first rear steering tube (136),
  (vi) optionally a first connection piece to connect the first side linking component to the first rear steering tube (136), which connection piece can be a gear or a pivot, for example the steering arm pivot (147) shown in FIG. 29,
  (vii) optionally a first swivel arm pivot (144).

The steering assembly (10) further comprises a second set of steering components comprising
  (viii) optionally a second tiller (131),
  (ix) optionally a second front steering tube (141),
  (x) optionally a second small link arm (146),
  (xi) optionally a second side linking component such as a link arm or preferably a side tie rod (132),
  (xii) a second rear steering tube (136),
  (xiii) optionally a second connection piece to connect the second side linking component (132) to the second rear steering tube (136), which connection piece can be a gear or a pivot, for example the steering arm pivot (147) shown in FIG. 29,
  (xiv) optionally second a swivel arm pivot (144).

The steering assembly (10) further comprises a rear connection piece such as a rear connecting tie rod (109) interconnecting one or more component of the first set of steering components to one or more component of the second set of steering components so that moving just one of the two tillers (131) forward or backward will turn both steering wheels (110, 111) simultaneously. In an embodiment, the connected elements are corresponding elements located on opposite sides of the VeloChair. In another embodiment, the connection is via a rear connecting tie rod (109). In yet another embodiment, the rear connecting tie rod (109) interconnects the corresponding rear steering tubes (136), the swivel arm pivots (144) or the steering arm pivots (147). In a particularly preferred embodiment, the rear connecting tie rod (109) interconnects the corresponding swivel arm pivots (144).

Final, it should be clear to those skilled in the art that the connections described with respect to the "armrest steering designs" can be adapted to be used will tiller(s), and the connection described with respect to the "tiller steering designs" can be adapted to be used with armrests(s), without departing from the spirit of the present invention.

The Drive Assembly (20)

The primary function of the drive assembly is to translate or transfer the rotational motion of the foot pedals (201) to the rotational motion of the first and the second drive wheels (202, 203). A suitable size for the drive wheel is about 20 inches in diameter, but larger or smaller sizes are also easily used in the invention, with smaller sized drive wheels more suitable for juvenile sized Pedal Chairs.

Figure 10:
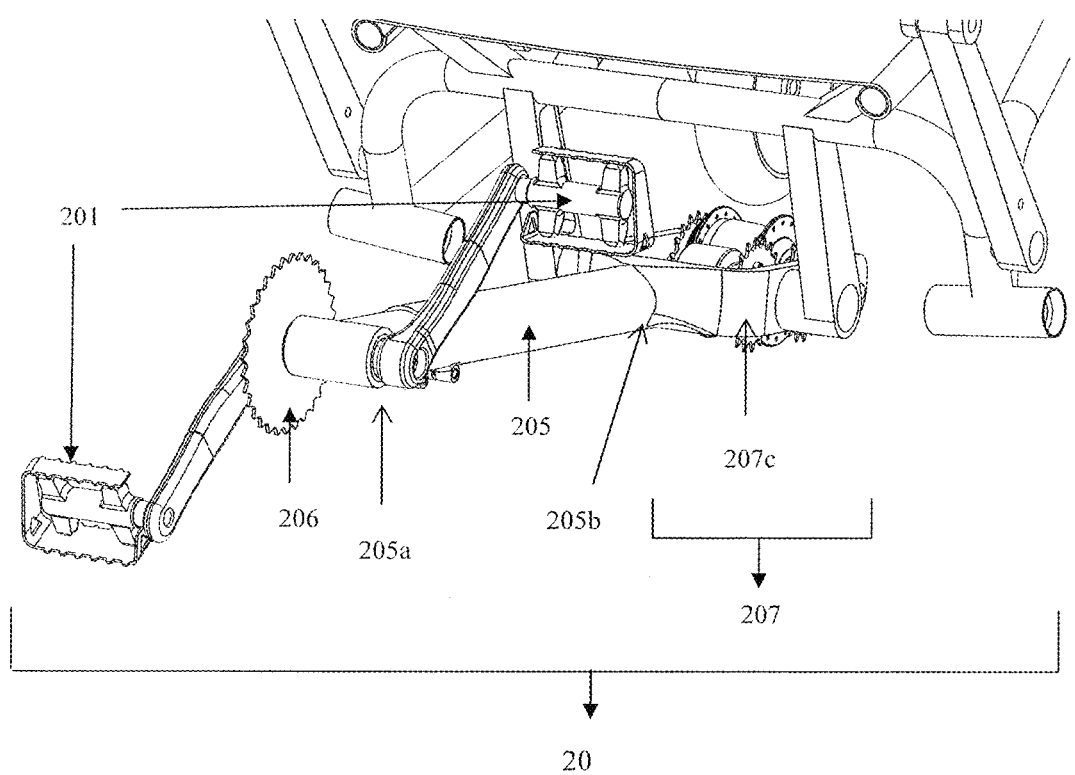
FIG. 10: shows a perspective, close-up view of an example of the drive assembly as described herein.
Figure 11:
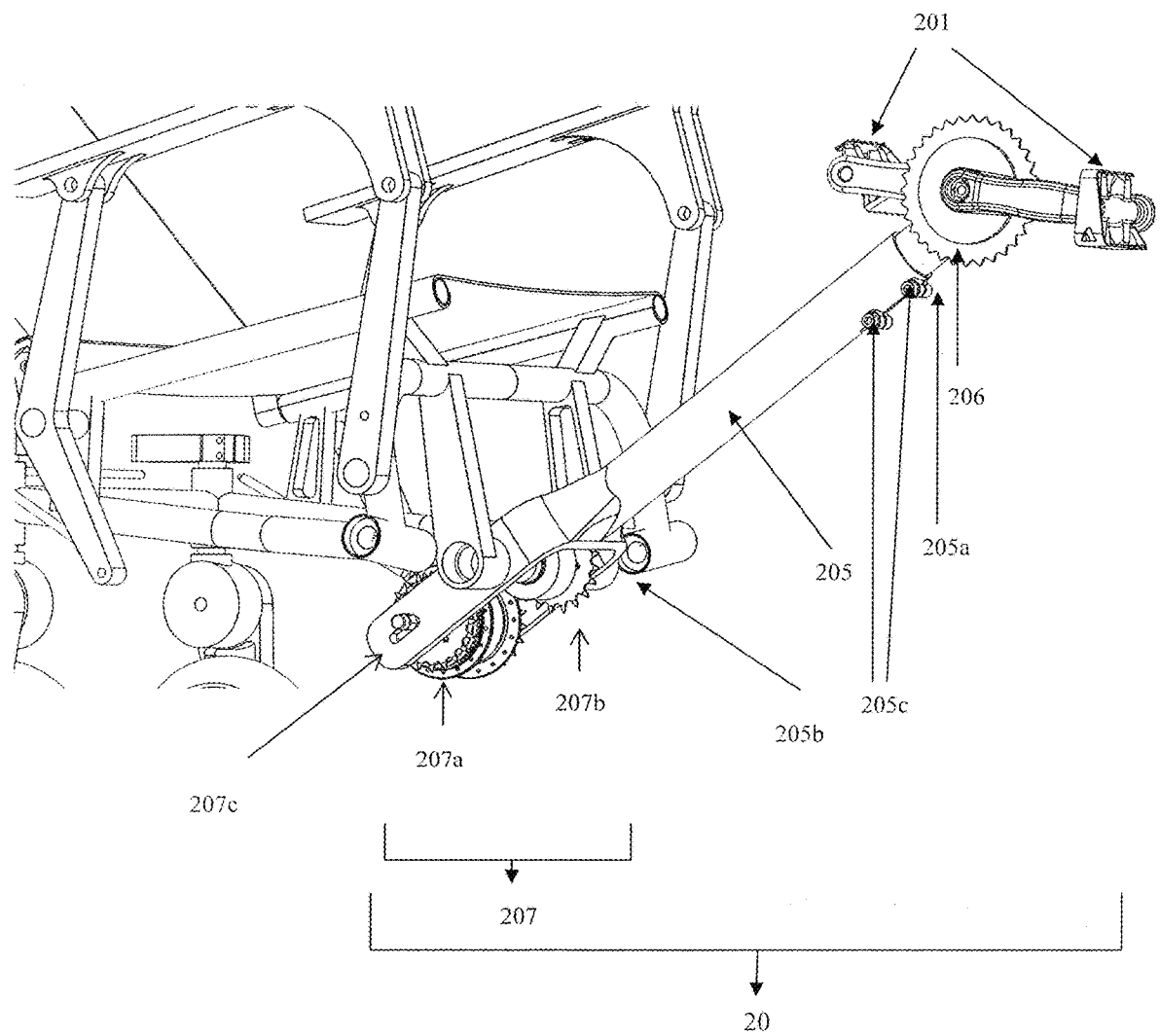
FIG. 11: shows a perspective, close-up view of an example of the drive assembly as described herein.
Figure 12:
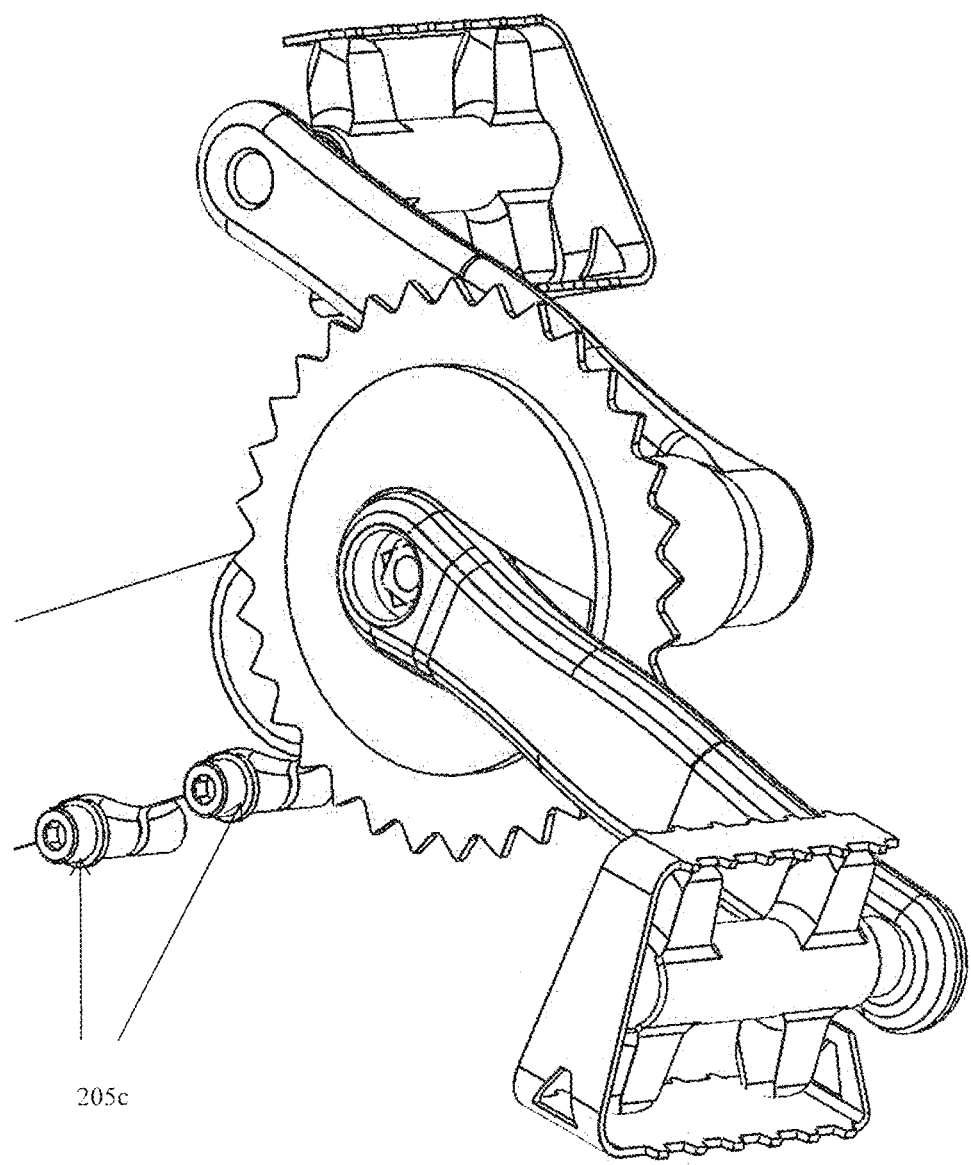
FIG. 12: shows a perspective, close-up view of an example of the foot pedals, associated pedal crank and boom extension locking bolts as described herein.
Figure 13:
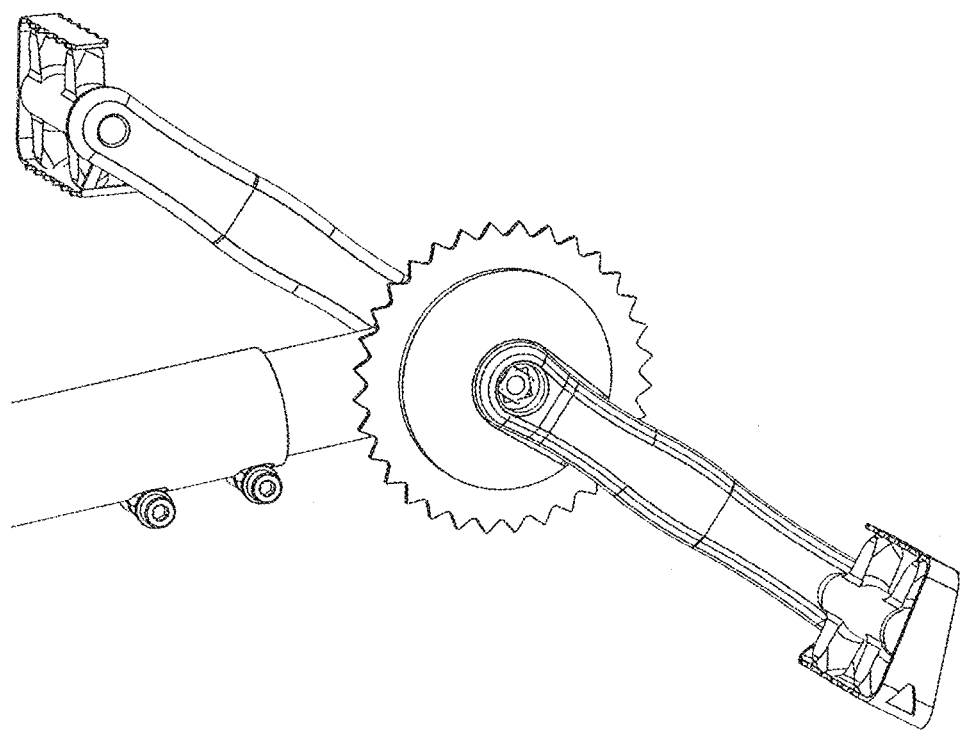
FIG. 13: shows a perspective, close-up view of an example of the foot pedals, associated pedal crank and boom extension locking bolts as described herein.
Figure 14:
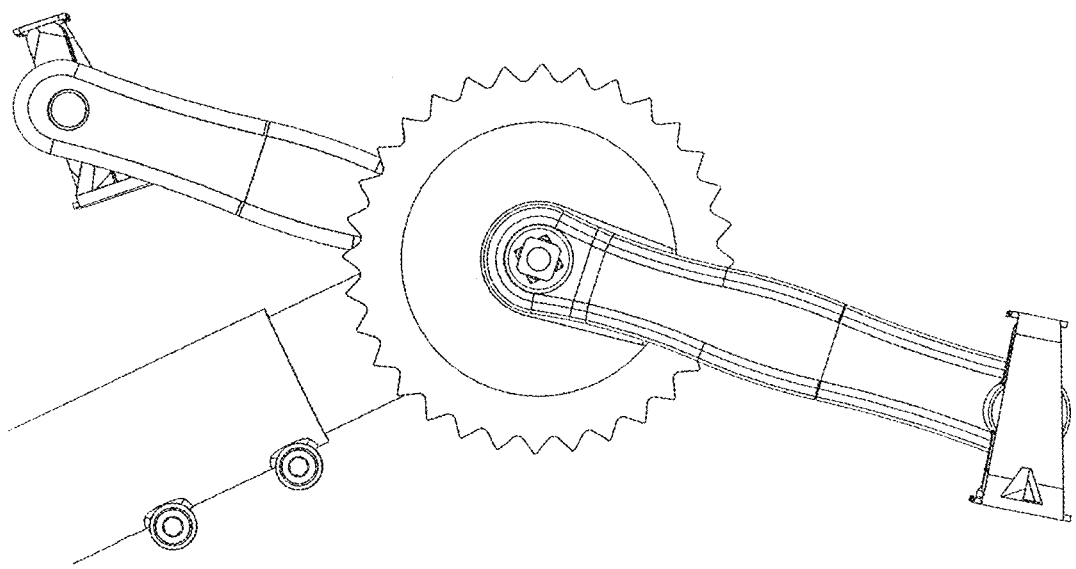
FIG. 14: shows a side, close-up view of an example of the foot pedals and associated pedal crank as described herein.
Figure 15:
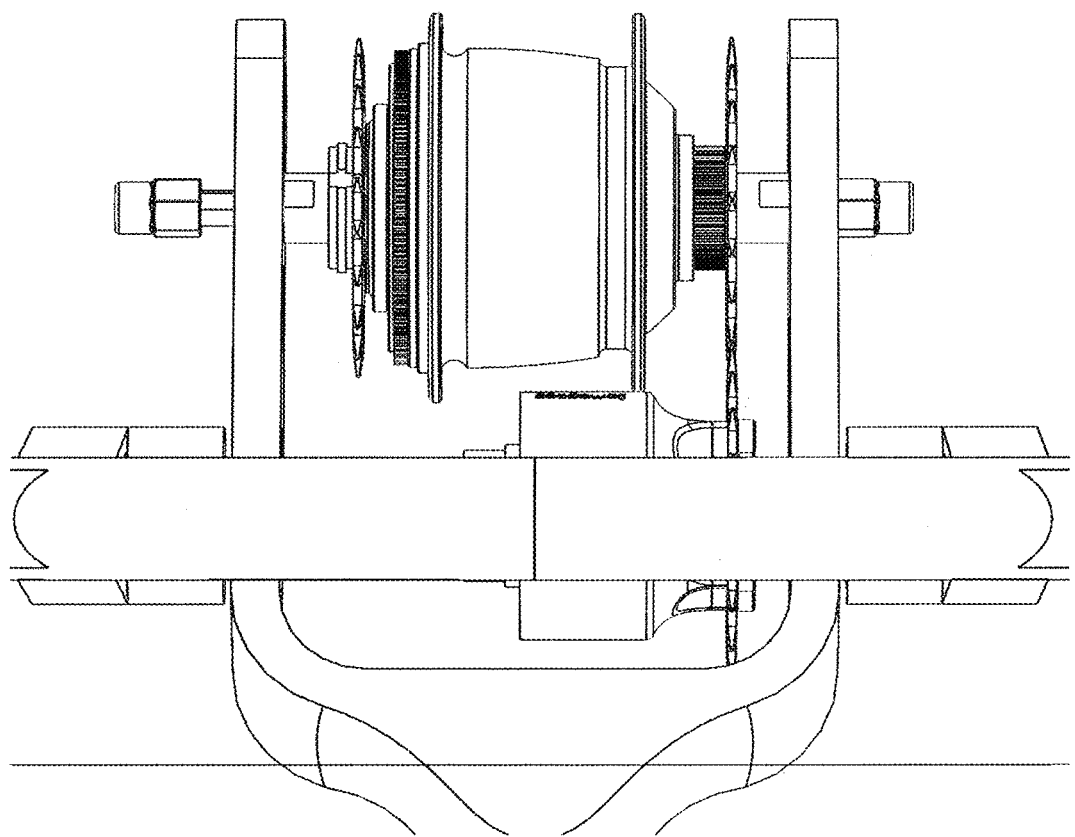
FIG. 15: shows a bottom, close-up view of an example of the gear hub (including transmission) as described herein.
Figure 16:
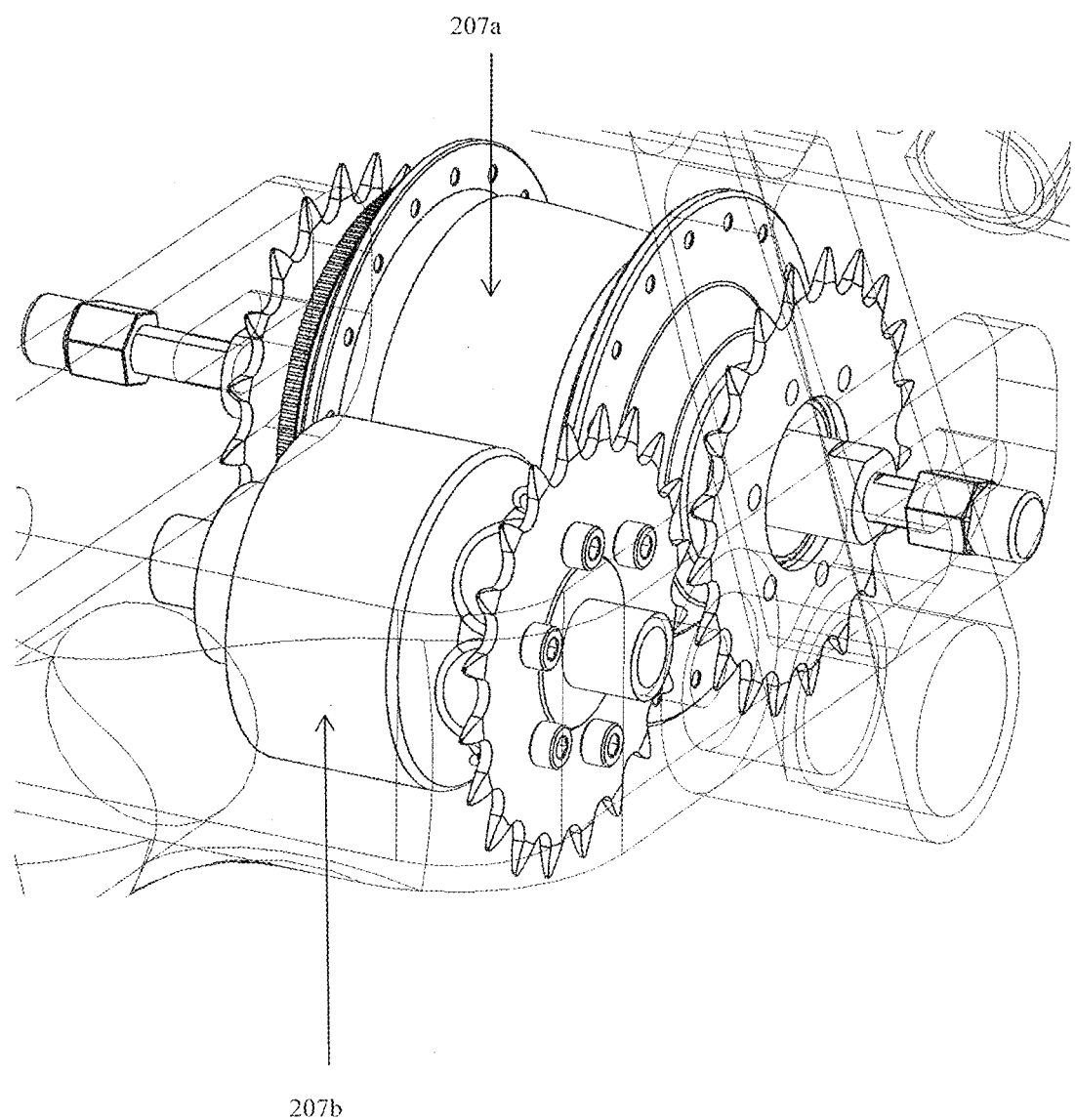
FIG. 16: shows a perspective, close-up view of an example of the gear hub (including transmission and differential) as described herein.
Figure 17:
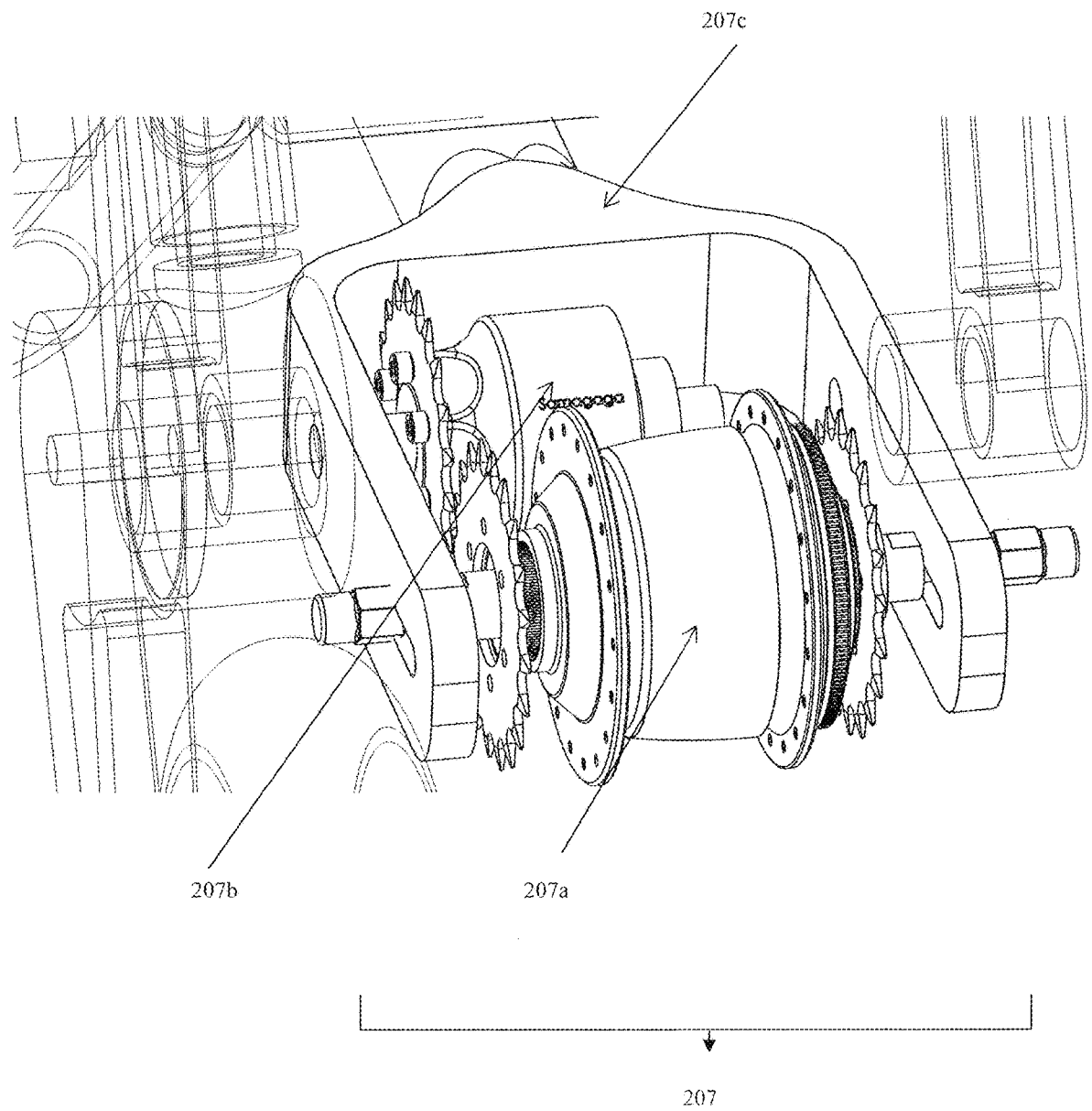
FIG. 17: shows a perspective, close-up view of an example of the gear hub (including transmission and differential) as described herein.

Referring to FIGS. 10 and 11, an embodiment of the drive assembly comprises components (i)-(vi): (i) a first drive wheel (202, not shown in FIGS. 10 and 11 but shown in other figures) and a second drive wheel (203, not shown in FIGS. 10 and 11 but shown in other figures each connected to an axle (204, not shown in FIGS. 10 and 11 but shown in other figures), which axle (204) can be common or separate; (ii) a support shaft (205) having a distal end (205a) and a proximal end (205b), wherein the proximal end (205b) of the support shaft is preferably located on the bottom side (1d) of the mobile chair apparatus (1); (iii) a pair of foot pedals (201) connected to a pedal crank (206) preferably located at the distal end (205a) of the support shaft (205); (iv) a gear hub (207) preferably located at the proximal end (205b) of the support shaft (205); (v) a first chain (not shown in the figures for purposes of retaining clarity in the drawing figures, but to be understood as operatively) connecting the pedal crank (206) to the transmission (207a) of the gear hub (207) whereby the chain transmits motive power from the pedal crank (206) to the transmission (207a) of the gear hub (207); and (vi) a second chain (also not shown in the figures for purposes of retaining clarity in the drawing figures) shorter in length than the first chain, said second chain (to be understood as operatively) connecting the transmission (207a) to a differential (207b) of the gear hub (207), which differential (207b) drives the axle or axles (204), whereby the small chain transmits motive power from the transmission (207a) to the axle or axles (204). FIGS. 10 and 11 show preferable but optional elements including the differential (207b) and a yoke (207c). FIG. 11 also shows optional element boom extension locking bolts (205c) which can lock/tighten the position of the length-wise adjustable boom.

The connection to the drive wheels (202, 203) can be achieved via a double chain configuration including a transmission (207a) and differential (207b) as described above or a direct connection (e.g., via a chain, a belt, a shaft) to a gear hub (207) that drives the separate axles, or common axle. The transmission can provide one or more forward gears (either "step up" or "step down" gears) and optionally one or more reverse gears. The gear hub (207) may assist the user in providing sufficient motive energy to the drive wheels (202, 203), and allows the Pedal Chair (1) to accommodate users of with different types and/or degree of disabilities, e.g., a person having reduced mobility in both legs, or a person having reduced mobility in only one working leg, with the other leg having a greater or lesser relative degree of mobility. It is to be understood that in alterative embodiments, the foot pedals (201) or pedal crank (206) may be operatively connected via a chain, a belt, a shaft or other mechanical linking means or linkage elements to the gear hub (207), as it is only necessary that the motive force provided by the user of the Pedal Chair via the pedals (201) be transferred or transmitted to the gear hub (207). In preferred embodiments the gear hub (207) and/or the transmission (207a, if present) incorporates into its construction a clutch assembly which allows for the rotation of the drive wheels (202, 203) even when the pedals (201) and their pedal crank (206) are not being rotated by the user of the Pedal Chair. In further preferred embodiments the gear hub (207) and/or transmission (207a, if present) incorporates into its construction a 'coaster brake' assembly which halts the rotation of the gear hub (207) (and/or the transmission 207a) when the rotational direction of the pedals (201) is reversed. Such "coaster brake" assemblies are known from single-speed and multi-speed bicycles, e.g., "Bendix" coaster brake rear hubs. Further braking mechanisms conventionally used in bicycles and wheelchairs are known to those having ordinary skill in the art, and can be incorporated into the Pedal Chair as descried herein.

In one embodiment the gear hub (207) is directly connected to the axle or axles (204) and is fully operative without an intermediate transmission (207a), which may be omitted. In such an embodiment such a gear hub (207) optionally but preferably incorporates into its construction a clutch assembly and/or a 'coaster brake' assembly as discussed above. The provision of a 'coaster brake' assembly provides an ancillary means for stopping the rotation of the drive wheels (202, 203) which may also be stopped by the user of the Pedal Chair manually grasping or gripping parts of the drive wheels (202, 203). In a further embodiment, a common axle is not present, but rather separate axles connect the first drive wheel (202) and the second drive wheel (203) part of the Pedal Chair. In such an embodiment, suitable mechanical or electro-mechanical means couple the gear hub (207) and/or the transmission (207a) to each of these separate axles connected to the first drive wheel (202) and the second drive wheel (203) and the mechanical or electro-mechanical means are used to drive one or both of the drive wheels (202, 203).

With reference to FIG. 25, according to a further embodiment of the present invention, the drive assembly (20) alternatively comprises: i. a first drive wheel and a second drive wheel each connected to an axle; ii. a support shaft having a distal end and a proximal end, wherein the proximal end of the support shaft is located on the bottom side of the mobile chair apparatus; iii. a pair of foot pedals connected to a crank located at the distal end of the support shaft; iv. a chain operably connecting the crank to the axle. According to this design, the need for a second chain and transmission is eliminated for a simpler and more basic mobile chair apparatus. As compared to the first embodiment of the drive assembly (20) described above, according to an alternative design for the drive assembly (20), transmission (207a) and the first chain directly attached to the transmission (207a) are eliminated.

According to a further embodiment of the present invention, the drive assembly (20) includes an electrical motor assist or includes a provision for incorporating an electrical motor assist in the future. The motor assist feature allows a person having limited physical ability to pedal on flat surfaces, and provide assistance only when needed, such as when the user is tired, or when the surface on which the Pedal Chair is traversing is more challenging. The motor assist is also a useful feature when the Pedal Chair is being used as an exercise/rehabilitation device. Specifically, a person can use the motor assist feature to perform interval training, that is, pedal for a period of time, then rest for a period of time, depending on the targeted rehabilitation protocol.

In use, an occupant user of the Pedal Chair enters and sits in the chair via a side/front entrance, and then swings their legs over the support shaft (boom). The feet of the user would be placed on the foot pedals. The feet can either be rested on the foot pedals, or strapped in via any known and available device for securing feet to, e.g., bicycle pedals or toe clips.

To propel the chair forward, the occupant user moves one or both legs in a circular motion on the foot pedals (201) which causes the pedal crank (206) to rotate; this motive force is translated via a chain, a belt, a shaft or other mechanical linking means or linkage elements to the gear hub (207), which in turn operates to rotate the drive wheels (202, 203). In the alternative drive assembly arrangement detailed above, the motive force of the rotating crank can be translated via a single chain to the axle (204), which in turn operates to rotate the drive wheels (202, 203), without need for a second chain. Movement speed of the Pedal Chair can be varied by varying speed of pedaling. Braking can be provided by a disc brake mounted on the front driving wheels which is actuated by a lever mounted on the armrest. Braking can also be provided by simply stopping pedaling, and if needed pedal in reverse.

Advantages of the Pedal Chair (1)

The Pedal Chair described herein provides stability, foldability and adjustability. Stability of the Pedal Chair is supported by the four wheels making simultaneous contact with the ground. The configuration of the four wheels provides an inherent stability to the Pedal Chair and makes the need for any kind of additional "outrigger" support unnecessary, or the need for a fifth (or further) wheel(s) necessary. The front drive wheels can be configured with negative camber to provide lateral stability at movement speeds not exceeding 4 mph. The rear steering wheels provide longitudinal stability at varying movement speeds and on inclines. The Pedal Chair is designed to be compliant with access requirements of the Americans with Disabilities Act (ADA).

One additional advantageous feature which, in preferred embodiments (as shown in the drawing figures) is provided by the Pedal Chair is its foldability. Specifically, the support shaft (boom) is able to swing under the chair by rotation around the axle or axles, thus the chair apparatus can be folded to accommodate a small storage space. This foldability is achievable with the double chain configuration or the single chain configuration (i.e., if the foot pedals (201) or pedal crank (206) is connected directed to the axle or axles (without the secondary small chain)). The seatback of the chair can also be connected to the seat or a chair frame on which the seat is mounted via a hinge or pivot connection so as to allow the seatback to fold down, thus providing further space reduction. The rear (steering) wheels can also be foldable through a release mechanism, thus providing yet further space reduction. Further, the two drive wheels can be connected via a quick release mechanism allowing for easy removal and installation. At its smallest size, the Pedal Chair has a dimension not exceeding 26 inches by 31 inches by 33 inches, allowing it to be portable, and fits into standard sized car trunk.

Another advantage of the Pedal Chair is its adjustability. Because the support shaft can be configured to be adjustable in both length (via the longitudinally sliding motion of an inner shaft within the outer shaft and locking bolts) and angle, the chair can comfortably accommodate users of a wide range of weight, height, built, etc. In a preferred embodiment, the boom can be adjusted lengthwise for up to 8 inches. The boom designed allowing it to be able to fold under the chair also allows the angle it forms to be adjusted up or down and then secured using a locking mechanism, which can be the same locking mechanism used to release and tighten the boom to fold under the chair.

Yet further, the tiller-facilitated steering is also advantageous since the tillers are removable on either side to enable ease of transfer in or out of the VeloChair.

Components of the mobile chair as described hereinabove can be made from conventional materials known in the art. In an embodiment, one or more components of the mobile chair or portions of said component or components can be made from aluminum, carbon fiber, or a mixture of both.

Finally, the combination of any embodiment or feature mentioned herein with one or more of any of the other separately mentioned embodiments or features is contemplated to be within the scope of the instant invention. In particular, each steering assembly arrangement described hereinabove can be combined with each drive assembly arrangement described hereinabove to produce the final Pedal Chair.

What is claimed is:

1. A mobile chair apparatus having a front end, a rear end, a top side, and a bottom side, comprising:
   (a) a steering assembly;
   (b) a drive assembly adjacent to the bottom side of the mobile chair apparatus; and
   (c) a seat adjacent to the top side of the mobile chair apparatus, wherein the drive assembly comprises components (i)-(iv) below:
   i. a first drive wheel and a second drive wheel each connected to an axle;
   ii. a support shaft having a distal end and a proximal end, wherein the proximal end of the support shaft is located on the bottom side of the mobile chair apparatus;
   iii. a pair of foot pedals connected to a crank located at the distal end of the support shaft, wherein the support shaft is rotatable from a first position to a second position, wherein, when disposed in the first position, the pair of foot pedals is located adjacent to the rear end of the mobile chair apparatus, and wherein, when disposed in the second position, the first drive wheel and the second drive wheel are disposed between the rear end of the mobile chair apparatus and the pair of foot pedals; and
   iv. a chain operably connecting the crank to the axle;
   or
   wherein the drive assembly comprises components (i)-(vi) below:
   i. a first drive wheel and a second drive wheel each connected to an axle;
   ii. a support shaft having a distal end and a proximal end, wherein the proximal end of the support shaft is located on the bottom side of the mobile chair apparatus;
   iii. a pair of foot pedals connected to a crank located at the distal end of the support shaft, wherein the support shaft is rotatable from a first position to a second position, wherein, when disposed in the first position, the pair of foot pedals is located adjacent to the rear end of the mobile chair apparatus, and wherein, when disposed in the second position, the first drive wheel and the second drive wheel are disposed between the rear end of the mobile chair apparatus and the pair of foot pedals;
   iv. a gear hub located at the proximal end of the support shaft;
   v. a first chain connecting the crank to the gear hub; and
   vi. a second chain shorter in length than the first chain, said second chain connecting the gear hub to the axles or connecting components of the gear hub.

2. A mobile chair apparatus having a front end, a rear end, a top side, and a bottom side, comprising:
   (a) a steering assembly;
   (b) a drive assembly; and
   (c) a seat,
   wherein the steering assembly comprises:
   a first tiller adjacent to the front end of the mobile chair apparatus;
   a first side link arm operably connected to the first tiller;
   a first steering wheel and a second steering wheel each located at the rear end of the mobile chair apparatus on opposite sides of the apparatus, the first steering wheel and the second steering wheel being operably connected to each other, and the first steering wheel having a rotational axis; and
   at least one first connection piece operably connecting the first side link arm to the first steering wheel and the second steering wheel such that the first steering wheel and the second steering wheel are movable in response to movement of the first tiller,
wherein the at least one first connection piece comprises a first rear steering tube, is located adjacent to rear end of the mobile chair apparatus, and is coplanar to a vertical plane extending perpendicular to the rotational axis of the first steering wheel.

3. The mobile chair apparatus of claim 2, wherein the first tiller is operably connected to the first rear steering tube via at least one of one or more link arms and one or more tie rods.

4. The mobile chair apparatus of claim 2, further comprising:
a steering arm pivot that operably connects the first rear steering tube to the first tiller.

5. The mobile chair apparatus of claim 2, further comprising:
a second rear steering tube located on the side of apparatus opposite with respect to the first rear steering tube and operably connected to the first rear steering tube.

6. The mobile chair apparatus of claim 5, wherein the first rear steering tube and the second rear steering tube are operably connected via a tie rod.

7. The mobile chair apparatus of claim 2, further comprising:
a second tiller operably connected to the second steering wheel.

8. The mobile chair apparatus of claim 7, further comprising:
a second rear steering tube operably connecting the second tiller to the second steering wheel.

9. The mobile chair apparatus of claim 8, wherein the second tiller is operably connected to the second rear steering tube via at least one of one or more second link arms and one or more second tie rods.

10. The mobile chair apparatus of claim 8, further comprising:
a second steering arm pivot operably connected to the second rear steering tube and the second tiller.

11. The mobile chair apparatus of claim 8, wherein the second rear steering tube is located on the side of the mobile chair apparatus opposite the first rear steering tube and is operably connected to the first rear steering tube.

12. The mobile apparatus of claim 11, wherein the first rear steering tube and the second rear steering tube are operably connected via a tie rod.

13. The mobile chair apparatus of claim 2, wherein the steering assembly comprises:
a first set of first steering components and a second set of second steering components, and a rear connection piece interconnecting one or more first steering components of the first set of first steering components to one or more second steering components of the second set of second steering components,
wherein the first set of first steering components comprises:
an optional first front steering tube;
an optional first small link arm;
the first side link arm or a side tie rod;
an optional first steering tube gear or first swivel arm pivot connected to the first rear steering tube,
and the second set of steering components comprises:
an optional second tiller;
an optional second front steering tube;
an optional second small link arm;
a second side linking component comprising a link arm or a side tie rod;
a second rear steering tube;
and
an optional second steering tube gear or a second swivel arm pivot connected to the second rear steering tube.

14. The mobile chair apparatus of claim 2, wherein the first rear steering tube is operatively connected to a swivel arm pivot disposed at the top of the first rear steering tube.

15. The mobile chair apparatus of claim 4, wherein the steering arm pivot is disposed between the first rear steering tube and the first steering wheel.

16. The mobile chair apparatus of claim 4, wherein the steering arm pivot is directly connected to the first rear steering tube.

17. The mobile chair apparatus of claim 4, wherein:
the steering arm pivot is operably connected to the first rear steering tube; and
an operative connection between the steering arm pivot and the first rear steering tube does not comprise a gear.

18. The mobile chair apparatus of claim 4, wherein:
the first tiller is operatively connected to the steering arm pivot via the side link arm; and
the first side link arm extends under the seat.

19. The mobile chair apparatus of claim 1, further comprising:
at least one steering wheel of the steering assembly having a first diameter, wherein
the at least one steering wheel is located adjacent to the rear end of the mobile chair apparatus,
the first drive wheel and the second drive wheel have a second diameter, and
the second diameter is greater than the first diameter.

20. The mobile chair apparatus of claim 2, further comprising: a steering tube gear or a steering arm pivot connected to the first rear steering tube.

21. A mobile chair apparatus having a front end, a rear end opposite to the front end, a top side, a bottom side opposite to the top side, and first and second opposite sides spaced from one another and which connect the front end to the rear end, the mobile chair apparatus comprising:
(a) a steering assembly;
(b) a drive assembly; and
(c) a seat,
wherein the steering assembly comprises:
a first tiller adjacent to the front end of the mobile chair apparatus;
a first side link arm operably connected to the first tiller;
a first steering wheel defining a first axis of rotation and located at the rear end of the mobile chair apparatus on the first opposite side of the mobile chair apparatus;
a second steering wheel defining a second axis of rotation and located at the rear end of the mobile chair apparatus on the second opposite side of the mobile chair apparatus, the first steering wheel and the second steering wheel being operably connected to each other;
a first pivotable connection piece located at the rear end of the mobile chair apparatus on the first opposite side of the mobile chair apparatus and operably connecting the first side link arm to the first steering wheel; and
a second pivotable connection piece located at the rear end of the mobile chair apparatus on the second opposite side of the mobile chair apparatus and being operably connected to the first pivotable connection piece and the second steering wheel such that the first steering wheel and the second steering wheel are movable in response to movement of the first tiller,
wherein, when the mobile chair apparatus is positioned upright on a flat surface, the first pivotable connection piece is spaced from and above the first axis of rotation and disposed over the first steering wheel and the second pivotable connection piece is spaced from and above the second axis of rotation and disposed over the second steering wheel.

* * * * *